United States Patent
Obuchi

(10) Patent No.: US 11,492,063 B1
(45) Date of Patent: Nov. 8, 2022

(54) OPERATING DEVICE FOR HUMAN-POWERED VEHICLE

(71) Applicant: SHIMANO INC., Sakai (JP)

(72) Inventor: Kohei Obuchi, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 17/330,364

(22) Filed: May 25, 2021

(51) Int. Cl.
  *B62K 23/06* (2006.01)
  *F15B 15/14* (2006.01)

(52) U.S. Cl.
  CPC .......... *B62K 23/06* (2013.01); *F15B 15/1447* (2013.01)

(58) Field of Classification Search
  None
  See application file for complete search history.

(56) References Cited

U.S. PATENT DOCUMENTS

| | | | | |
|---|---|---|---|---|
| 5,584,210 A | * | 12/1996 | Gelbein | F16B 2/08 74/489 |
| 9,327,795 B2 | * | 5/2016 | Miki | B62K 23/00 |
| 2019/0225299 A1 | | 7/2019 | Komada et al. | |
| 2021/0061404 A1 | | 3/2021 | Kosaka | |
| 2021/0061407 A1 | * | 3/2021 | Kosaka | B62K 23/06 |

* cited by examiner

*Primary Examiner* — Vicky A Johnson
(74) *Attorney, Agent, or Firm* — Mori & Ward, LLP

(57) ABSTRACT

An operating device comprises a base member and an operating member. The base member includes a base body and a mounting part. The mounting part includes a mounting contact surface contactable with a tubular part of the human-powered vehicle in a mounting state where the mounting part couples the base body to the tubular part of the human-powered vehicle. The base member includes a first contact surface and a second contact surface. The first contact surface is contactable with the tubular part of the human-powered vehicle in the mounting state. The first contact surface is spaced apart from the mounting contact surface in an axial direction. The second contact surface is contactable with the tubular part of the human-powered vehicle in the mounting state. The second contact surface is spaced apart from the mounting contact surface and the first contact surface in the axial direction.

21 Claims, 14 Drawing Sheets

OPERATING DEVICE FOR HUMAN-POWERED VEHICLE

BACKGROUND OF THE INVENTION

Field of the Invention

The present invention relates to an operating device for a human-powered vehicle.

Discussion of the Background

A human-powered vehicle includes an operating apparatus configured to operate an operated apparatus. The operating apparatus includes a base part and an operating part. The operating part is movably coupled to the base part. The operating part is movable relative to the base part in response to a force applied to the operating part from the user. A rotational force may be applied to the base part about a coupling part coupling to the base part to a portion of the human-powered vehicle. It is preferable that rigidity of the operating apparatus is improved. One object of the present disclosure is to provide an operating device having higher rigidity against a force applied to an operating member. Another object of the present disclosure is to efficiently utilize a space around the operating device while improving rigidity of the operating device.

SUMMARY OF THE INVENTION

In accordance with a first aspect of the present invention, an operating device for a human-powered vehicle comprises a base member and an operating member. The base member includes a base body and a mounting part. The mounting part is configured to couple the base body to a tubular part of the human-powered vehicle. At least part of the mounting part is integrally provided with the base body as a one-piece unitary member. The operating member is movably coupled to the base member. The mounting part includes a mounting contact surface contactable with the tubular part of the human-powered vehicle in a mounting state where the mounting part couples the base body to the tubular part of the human-powered vehicle. The mounting part includes a mounting opening having an opening center axis defined along a longitudinal center axis of the tubular part of the human-powered vehicle in the mounting state. The base member includes a first contact surface and a second contact surface. The first contact surface is contactable with the tubular part of the human-powered vehicle in the mounting state. The first contact surface is spaced apart from the mounting contact surface in an axial direction with respect to the opening center axis. The second contact surface is contactable with the tubular part of the human-powered vehicle in the mounting state. The second contact surface is spaced apart from the mounting contact surface and the first contact surface in the axial direction. The mounting contact surface is provided between the first contact surface and the second contact surface in the axial direction.

With the operating device according to the first aspect, the first contact surface can receive a first rotational force about the mounting contact surface when a first force is applied to the operating member. The second contact surface can receive a second rotational force about the mounting contact surface when a second force is applied to the operating member. Thus, the first contact surface and the second contact surface can reduce influence caused by the first and second forces applied to the operating member, improving rigidity of the operating device.

In accordance with a second aspect of the present invention, the operating device according to the first aspect is configured so that the base member includes a cylinder bore and an intermediate hole extending from the cylinder bore toward the first contact surface.

With the operating device according to the second aspect, it is possible to effectively utilizes a portion provided between the cylinder bore and the first contact surface for the intermediate hole while the first contact surface and the second contact surface can reduce influence caused by the forces applied to the operating member, improving rigidity of the operating device.

In accordance with a third aspect of the present invention, an operating device for a human-powered vehicle comprises a base member and an operating member. The base member includes a base body and a mounting part configured to couple the base body to a tubular part of the human-powered vehicle. The operating member is movably coupled to the base member. The mounting part includes a mounting contact surface contactable with the tubular part of the human-powered vehicle in a mounting state where the mounting part couples the base body to the tubular part of the human-powered vehicle. The mounting part includes a mounting opening having an opening center axis defined along a longitudinal center axis of the tubular part of the human-powered vehicle in the mounting state. The base member includes a first contact surface, a cylinder bore, and an intermediate hole. The first contact surface is contactable with the tubular part of the human-powered vehicle in the mounting state. The first contact surface is spaced apart from the mounting contact surface in an axial direction with respect to the opening center axis. The intermediate hole extends from the cylinder bore toward the first contact surface.

With the operating device according to the third aspect, the first contact surface can receive a first rotational force about the mounting contact surface when a first force is applied to the operating member. Thus, the first contact surface can reduce influence caused by the first force applied to the operating member, improving rigidity of the operating device. Furthermore, it is possible to effectively utilizes a portion provided between the cylinder bore and the first contact surface for the intermediate hole.

In accordance with a fourth aspect of the present invention, the operating device according to the first or second aspect is configured so that the base member includes a first support and a second support. The first support includes the first contact surface. The first support extends from the base body toward the tubular part of the human-powered vehicle in the mounting state. The second support includes the second contact surface. The second support extends from the base body toward the tubular part of the human-powered vehicle in the mounting state.

With the operating device according to the fourth aspect, the first contact surface and the second contact surface can receive the first rotational force and the second rotational force while the base body is spaced apart from the tubular part of the human-powered vehicle.

In accordance with a fifth aspect of the present invention, the operating device according to the fourth aspect is configured so that at least one of the first support and the second support is integrally provided with the base body as a one-piece unitary member.

With the operating device according to the fifth aspect, the at least one of the first support and the second support can improve rigidity of the base member.

In accordance with a sixth aspect of the present invention, the operating device according to any one of the first, second, fourth, and fifth aspects is configured so that the first contact surface is closer to the mounting contact surface than the second contact surface in the axial direction.

With the operating device according to the sixth aspect, it is possible to efficiently arrange the first contact surface in a space defined around the mounting contact surface.

In accordance with a seventh aspect of the present invention, the operating device according to any one of the first to sixth aspects is configured so that the operating member is pivotally coupled to the base body about a pivot axis. The mounting contact surface is closer to the pivot axis than the first contact surface in the axial direction.

With the operating device according to the seventh aspect, the first contact surface can reliably receive the first rotational force about the mounting contact surface when the first force applied to the operating member. Thus, the first contact surface can reduce influence caused by the first force applied to the operating member, improving reliably the rigidity of the operating device.

In accordance with an eighth aspect of the present invention, the operating device according to any one of the first to seventh aspects is configured so that the mounting part includes a first mounting portion and a second mounting portion. The first mounting portion is integrally provided with the base body as a one-piece unitary member. The second mounting portion is pivotally coupled to the first mounting portion about a first mounting pivot axis. The mounting contact surface is provided on at least one of the first mounting portion and the second mounting portion.

With the operating device according to the eighth aspect, the second mounting portion enables the mounting part to be easily detachable from and reattachable to the tubular part of the human-powered vehicle.

In accordance with a ninth aspect of the present invention, the operating device according to the eighth aspect is configured so that the mounting part includes a third mounting portion pivotally coupled to the second mounting portion about a second mounting pivot axis. The mounting contact surface is provided to at least one of the first mounting portion, the second mounting portion, and the third mounting portion.

With the operating device according to the ninth aspect, the second mounting portion and the third mounting portion enable the mounting part to be more easily detachable from and reattachable to the tubular part of the human-powered vehicle.

In accordance with a tenth aspect of the present invention, the operating device according to any one of the second to ninth aspects is configured so that the base member includes a first support including the first contact surface. The first support extends from the base body toward the tubular part of the human-powered vehicle in the mounting state. The intermediate hole is at least partially provided in the first support.

With the operating device according to the tenth aspect, it is possible to efficiently utilize the first support for the intermediate hole.

In accordance with an eleventh aspect of the present invention, the operating device according to any one of the second to tenth aspects is configured so that the intermediate hole includes an end opening provided on the first contact surface and extends from the cylinder bore to the end opening.

With the operating device according to the eleventh aspect, it is possible to more efficiently utilize the first support for the intermediate hole.

In accordance with a twelfth aspect of the present invention, the operating device according to the eleventh aspect is configured so that the base member includes a seal member provided in the intermediate hole to close the intermediate hole.

With the operating device according to the twelfth aspect, it is possible to close the intermediate hole while efficiently utilizing the first support for the intermediate hole.

In accordance with a thirteenth aspect of the present invention, the operating device according to the twelfth aspect is configured so that the seal member is provided between the cylinder bore and the end opening.

With the operating device according to the thirteenth aspect, it is possible to reliably avoid interference between the seal member and the tubular part of the human-powered vehicle while the seal member closes the intermediate hole.

In accordance with a fourteenth aspect of the present invention, the operating device according to any one of the second to thirteenth aspects is configured so that the base member includes a hose-attachment hole configured to be detachably connected with a hydraulic hose. The hose-attachment hole is configured to be in communication with the intermediate hole.

With the operating device according to the fourteenth aspect, it is possible to connect the hose-attachment hole to the cylinder bore via the intermediate hole.

In accordance with a fifteenth aspect of the present invention, the operating device according to the fourteenth aspect is configured so that the cylinder bore has a cylinder center axis and extends the cylinder center axis. The hose-attachment hole extends from the intermediate hole along the cylinder center axis.

With the operating device according to the fifteenth aspect, it is possible to efficiently arrange the hose-attachment hole and the intermediate hole.

In accordance with a sixteenth aspect of the present invention, the operating device according to the fourteenth or fifteenth aspect is configured so that the hose-attachment hole extends from the intermediate hole along the axial direction.

With the operating device according to the sixteenth aspect, it is possible to more efficiently arrange the hose-attachment hole and the intermediate hole.

In accordance with a seventeenth aspect of the present invention, the operating device according to any one of the fourteenth to sixteenth aspects is configured so that the hose-attachment hole extends from the intermediate hole away from the mounting contact surface along the axial direction.

With the operating device according to the seventeenth aspect, it is possible to more efficiently arrange the hose-attachment hole and the intermediate hole.

In accordance with an eighteenth aspect of the present invention, the operating device according to any one of the second to seventeenth aspects further comprises a piston movably provided in the cylinder bore. The operating member is movable relative to the base member between a rest position and an operated position. The piston is coupled to the operating member to be pulled in a pulling direction in response to a pulling movement of the operating member from the rest position to the operated position.

With the operating device according to the eighteenth aspect, it is possible to improve rigidity of the operating device in which the piston is pulled by the operating member.

In accordance with a nineteenth aspect of the present invention, the operating device according to any one of the first to eighteenth aspects is configured so that the mounting part includes a coupling portion to which an additional device is to be coupled.

With the operating device according to the nineteenth aspect, the coupling portion enables the additional device to be coupled to the mounting part.

In accordance with a twentieth aspect of the present invention, the operating device according to the nineteenth aspect is configured so that the coupling portion includes a coupling opening to which the additional device is to be coupled.

With the operating device according to the twentieth aspect, the coupling portion enables the additional device to be coupled to the mounting part with a simple structure.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
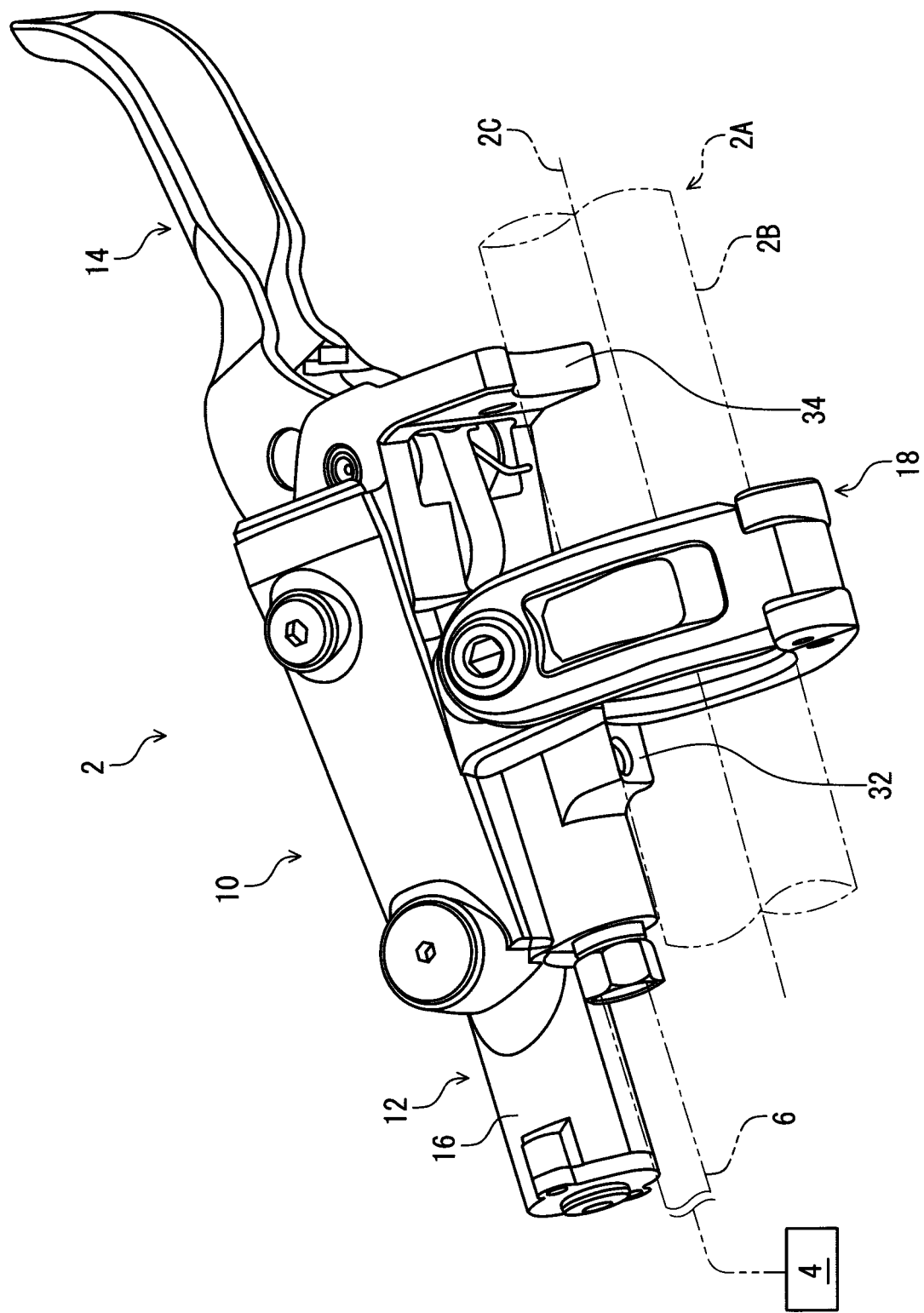
FIG. 1 is a perspective view of an operating device for a human-powered vehicle.

The embodiment(s) will now be described with reference to the accompanying drawings, wherein like reference numerals designate corresponding or identical elements throughout the various drawings.

As seen in FIG. 1, an operating device 10 for a human-powered vehicle 2 comprises a base member 12 and an operating member 14. The base member 12 is configured to be mounted to the human-powered vehicle 2. The operating member 14 is movably coupled to the base member 12. In the present embodiment, the base member 12 is configured to be coupled to a vehicle body 2A of the human-powered vehicle 2. The base member 12 is configured to be coupled to a tubular part 2B (e.g., a handlebar) of the vehicle body 2A of the human-powered vehicle 2. The tubular part 2B has a longitudinal center axis 2C. The tubular part 2B extends along the longitudinal center axis 2C. However, the base member 12 can be mounted to other parts of the human-powered vehicle 2 if needed and/or desired.

The operating device 10 is configured to be connected to an operated device 4 via a hydraulic hose 6. However, the operating device 10 can be configured to be connected to other devices via members other than the hydraulic hose 6 if needed and/or desired.

In the present application, a human-powered vehicle is a vehicle to travel with a motive power including at least a human power of a user who rides the human-powered vehicle (i.e., rider). The human-powered vehicle includes a various kind of bicycles such as a mountain bike, a road bike, a city bike, a cargo bike, a hand bike, and a recumbent bike. Furthermore, the human-powered vehicle includes an electric bike (E-bike). The electric bike includes an electrically assisted bicycle configured to assist propulsion of a vehicle with an electric motor. However, a total number of wheels of the human-powered vehicle is not limited to two. For example, the human-powered vehicle includes a vehicle having one wheel or three or more wheels. Especially, the human-powered vehicle does not include a vehicle that uses only an internal-combustion engine as motive power. Generally, a light road vehicle, which includes a vehicle that does not require a driver's license for a public road, is assumed as the human-powered vehicle.

In the present application, the following directional terms "front," "rear," "forward," "rearward," "left," "right," "transverse," "upward" and "downward" as well as any other similar directional terms refer to those directions which are determined on the basis of a user (e.g., a rider) who is in the user's standard position (e.g., on a saddle or a seat) in the human-powered vehicle 2 with facing a handlebar or steering. Accordingly, these terms, as utilized to describe the operating device 10 or other components, should be interpreted relative to the human-powered vehicle 2 equipped with the operating device 10 or other components as used in an upright riding position on a horizontal surface.

In the present embodiment, the operating device 10 is a right-hand operating device configured to be operated by a user's right hand. However, structures of the operating device 10 can be applied to a left-hand operating device if needed and/or desired.

The base member 12 includes a base body 16 and a mounting part 18. The mounting part 18 is configured to couple the base body 16 to the tubular part 2B of the human-powered vehicle 2. In the present embodiment, the mounting part 18 includes a clamp. However, the mounting part 18 can have structures other than the clamp if needed and/or desired.

Figure 2:
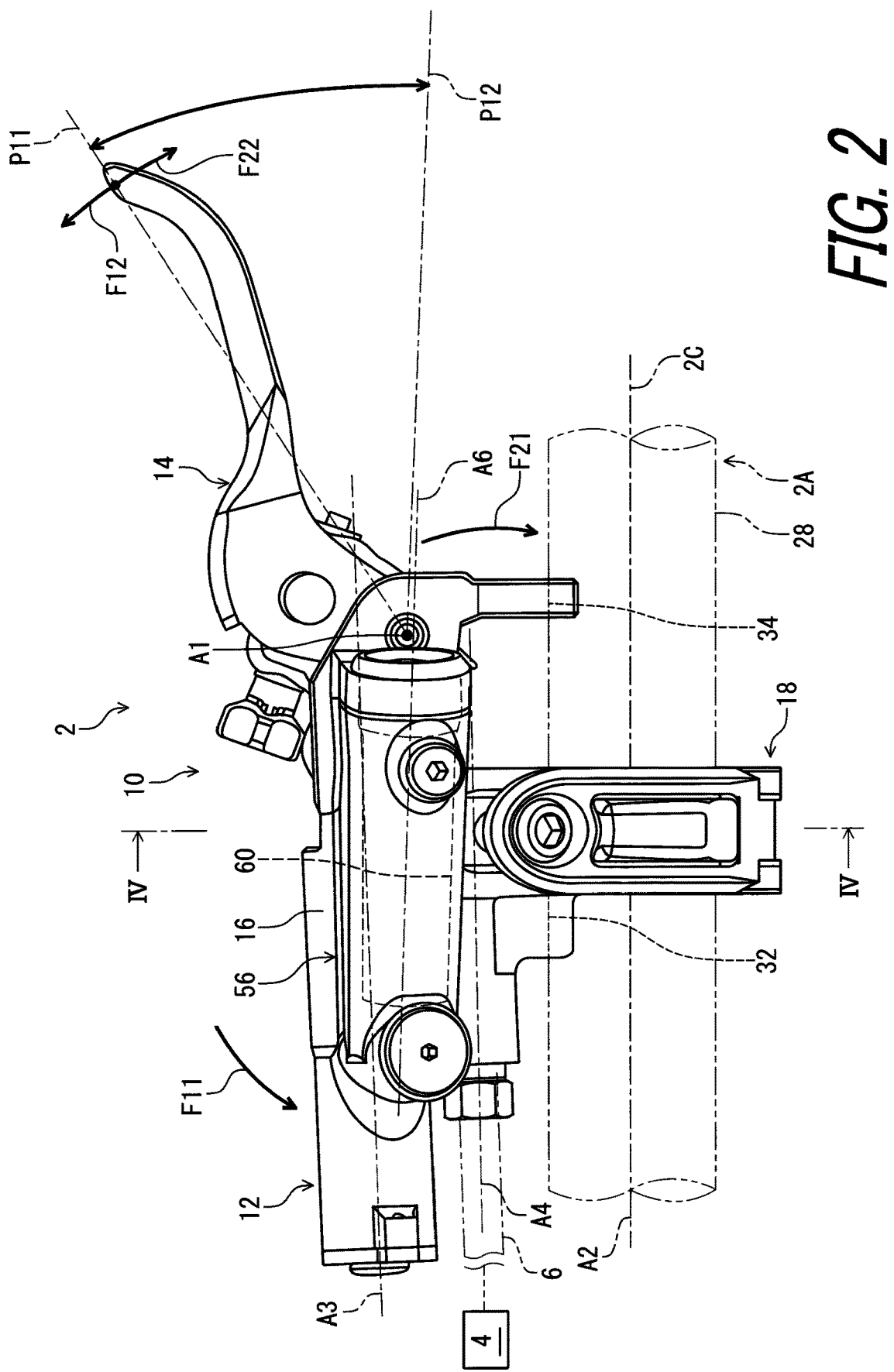
FIG. 2 is a top view of the operating device illustrated in FIG. 1.

As seen in FIG. 2, the operating member 14 is movable relative to the base member 12 between a rest position P11 and an operated position P12. In the present embodiment, the operating member 14 is pivotally coupled to the base member 12 about a pivot axis A1. The operating member 14 is pivotally coupled to the base body 16 about the pivot axis A1. The operating member 14 is pivotable relative to the base member 12 about the pivot axis A1 between the rest position P11 and the operated position P12. The operating member 14 is pivotable relative to the base body 16 about the pivot axis A1 between the rest position P11 and the operated position P12.

In the present application, the term "rest position" as used herein refers to a position at which a movable part such as the operating member 14 remains stationary in a state where the movable part is not operated by the user. The term "operated position" as used herein refers to a position at which the movable part has been operated by the user to perform an operation of a bicycle component such as the operated device 4.

Figure 3:
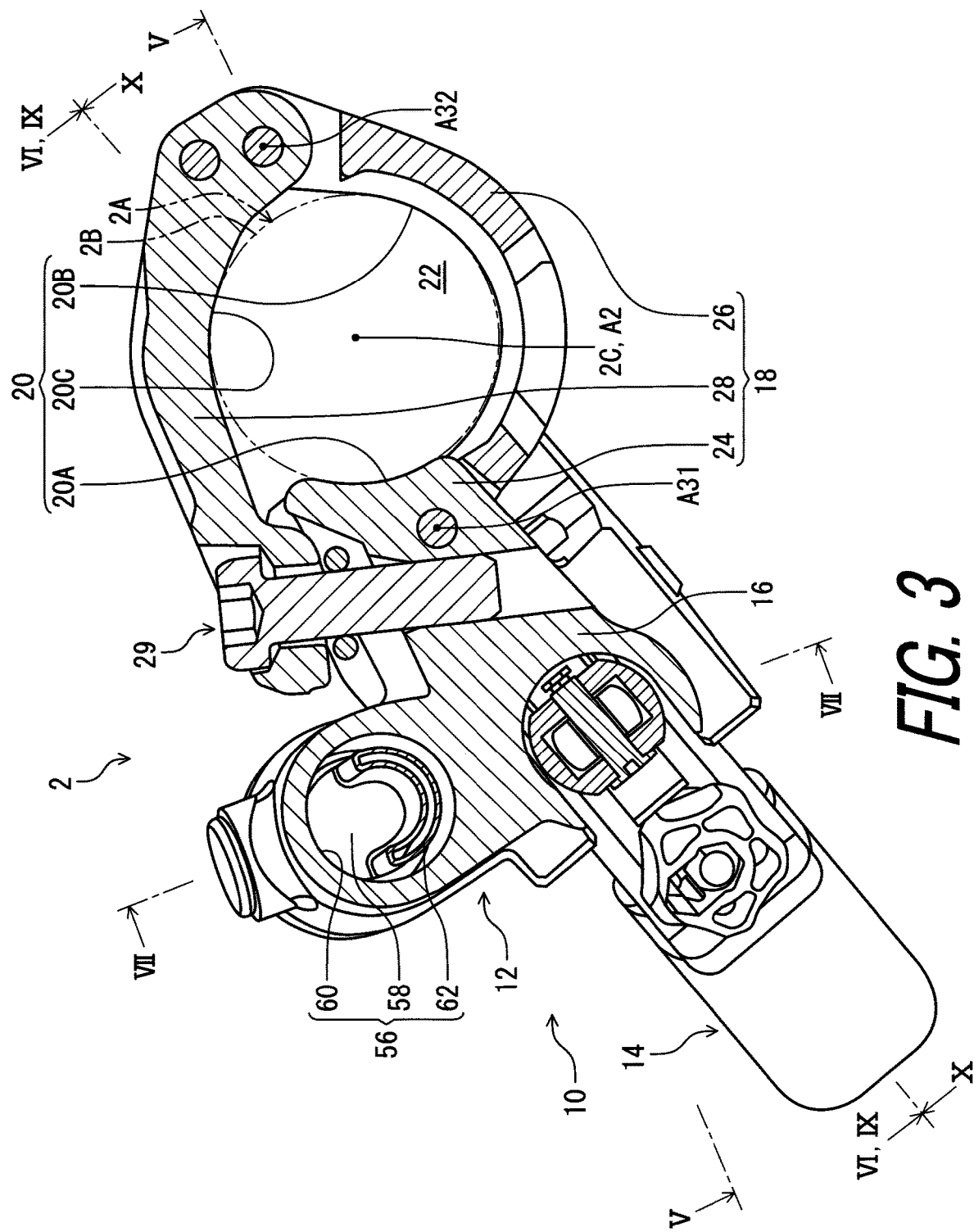
FIG. 3 is a cross-sectional view of the operating device taken along line III-III of FIG. 2.

As seen in FIG. 3, the mounting part 18 includes a mounting contact surface 20. The mounting contact surface 20 is contactable with the tubular part 2B of the human-powered vehicle 2 in a mounting state where the mounting part 18 couples the base body 16 to the tubular part 2B of the human-powered vehicle 2.

The mounting part 18 includes a mounting opening 22. The mounting opening 22 has an opening center axis A2 defined along a longitudinal center axis 2C of the tubular part 2B of the human-powered vehicle 2 in the mounting state. The opening center axis A2 of the mounting opening 22 is coincident with the longitudinal center axis 2C of the tubular part 2B of the human-powered vehicle 2 in the mounting state.

The mounting part 18 includes a first mounting portion 24 and a second mounting portion 26. The second mounting portion 26 is pivotally coupled to the first mounting portion 24 about a first mounting pivot axis A31. The mounting part 18 includes a third mounting portion 28. The third mounting portion 28 is pivotally coupled to the second mounting portion 26 about a second mounting pivot axis A32. The mounting part 18 includes a fastener 29. The fastener 29 is configured to fasten the third mounting portion 28 to the base body 16.

In the present embodiment, at least part of the mounting part 18 is integrally provided with the base body 16 as a one-piece unitary member. In the present embodiment, the first mounting portion 24 is integrally provided with the base body 16 as a one-piece unitary member. The second mounting portion 26 is a separate member from the base body 16, the first mounting portion 24, and the third mounting portion 28. The third mounting portion 28 is a separate member from the base body 16, the first mounting portion 24, and the second mounting portion 26. However, the first mounting portion 24 can be a separate member from the base body 16 if needed and/or desired. The second mounting portion 26 can be integrally provided with at least one of the base body 16, the first mounting portion 24, and the third mounting portion 28 if needed and/or desired. The third mounting portion 28 can be integrally provided with at least one of the base body 16, the first mounting portion 24, and the second mounting portion 26 if needed and/or desired.

The mounting contact surface 20 is provided on at least one of the first mounting portion 24 and the second mounting portion 26. The mounting contact surface 20 is provided to at least one of the first mounting portion 24, the second mounting portion 26, and the third mounting portion 28.

In the present embodiment, the mounting contact surface 20 is provided to the first mounting portion 24, the second mounting portion 26, and the third mounting portion 28. The mounting contact surface 20 includes a first mounting contact surface 20A, a second mounting contact surface 20B, and a third mounting contact surface 20C. The first mounting contact surface 20A is provided on the first mounting portion 24. The second mounting contact surface 20B is provided on the second mounting portion 26. The third mounting contact surface 20C is provided on the third mounting portion 28. However, the mounting contact surface 20 can be provided to at least one of the first mounting portion 24, the second mounting portion 26, and the third mounting portion 28 if needed and/or desired. At least one of the first mounting contact surface 20A, the second mounting contact surface 20B, and the third mounting contact surface 20C can be omitted from the mounting contact surface 20 if needed and/or desired.

Figure 4:
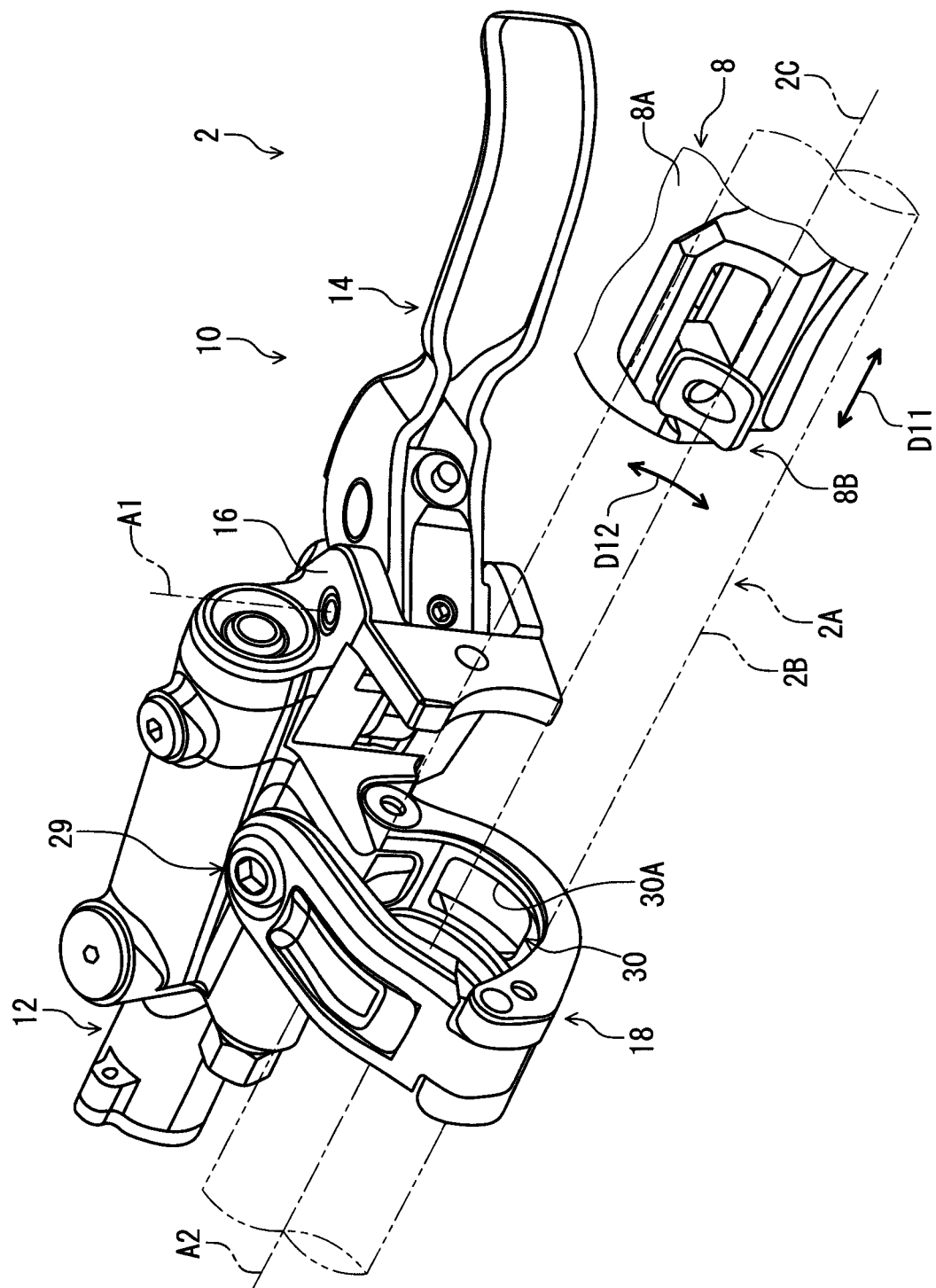
FIG. 4 is a perspective view of the operating device and an additional device for the human-powered vehicle.

As seen in FIG. 4, the mounting part 18 includes a coupling portion 30 to which an additional device 8 is to be coupled. The coupling portion 30 includes a coupling opening 30A to which the additional device 8 is to be coupled. The additional device 8 includes an additional body 8A and an additional coupling part 8B. The additional coupling part 8B is configured to couple the additional body 8A. The additional coupling part 8B is configured to extend through the coupling opening 30A. The additional coupling part 8B is configured to adjustably couple the additional body 8A to the coupling portion 30 of the mounting part 18 such that a positional relationship between the additional body 8A and the mounting part 18 is adjustable within an adjustable range. The additional coupling part 8B is configured to adjustably couple the additional body 8A to the coupling portion 30 of the mounting part 18 such that a positional relationship between the additional body 8A and the mounting part 18 is adjustable within the adjustable range in at least one of a first direction D11 and a second direction D12. The first direction D11 is defined along the longitudinal center axis 2C of the tubular part 2B of the human-powered vehicle 2. The second direction D12 is defined in a circumferential direction about the longitudinal center axis 2C of the tubular part 2B of the human-powered vehicle 2.

Figure 5:
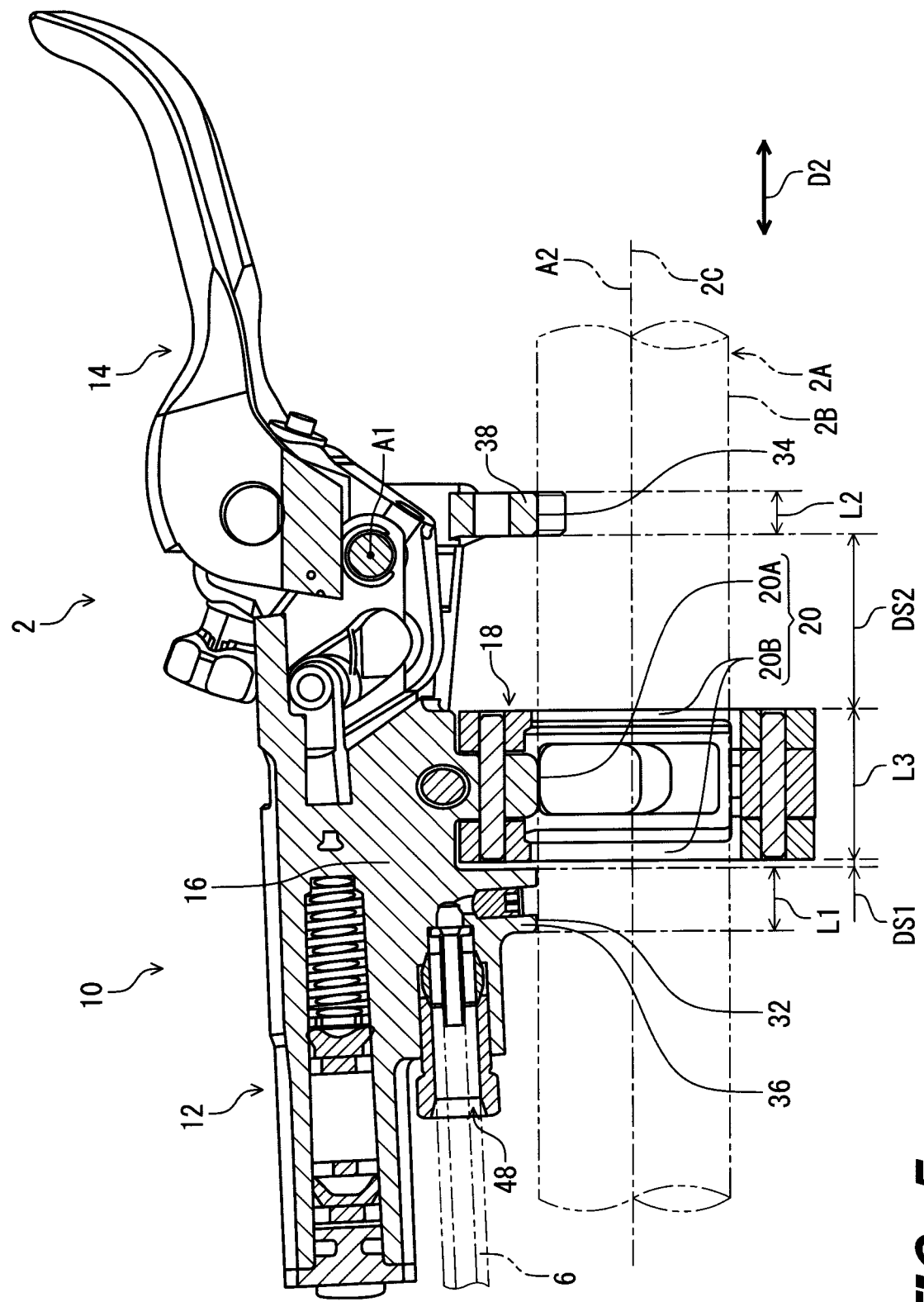
FIG. 5 is a cross-sectional view of the operating device taken along line V-V of FIG. 3.

As seen in FIG. 5, the base member 12 includes a first contact surface 32. The first contact surface 32 is contactable with the tubular part 2B of the human-powered vehicle 2 in the mounting state. The first contact surface 32 is spaced apart from the mounting contact surface 20 in an axial direction D2 with respect to the opening center axis A2.

The base member 12 includes a second contact surface 34. The second contact surface 34 is contactable with the tubular part 2B of the human-powered vehicle 2 in the mounting state. The second contact surface 34 is spaced apart from the mounting contact surface 20 and the first contact surface 32 in the axial direction D2. The mounting contact surface 20 is provided between the first contact surface 32 and the second contact surface 34 in the axial direction D2.

In the present embodiment, the first contact surface 32 is closer to the mounting contact surface 20 than the second contact surface 34 in the axial direction D2. The first contact surface 32 is closer to the first mounting contact surface 20A than the second contact surface 34 in the axial direction D2. The mounting contact surface 20 is closer to the pivot axis A1 than the first contact surface 32 in the axial direction D2. The second contact surface 34 is closer to the pivot axis A1 than the first contact surface 32 in the axial direction D2. The second contact surface 34 is closer to the pivot axis A1 than mounting contact surface 20 in the axial direction D2. A first distance DS1 is defined between the first contact surface 32 and the mounting contact surface 20 in the axial direction D2. A second distance DS2 is defined between the second contact surface 34 and the mounting contact surface 20 in the axial direction D2. The first distance DS1 is shorter than the second distance DS2.

However, the positional relationships among the mounting contact surface 20, the first contact surface 32, the second contact surface 34, the pivot axis A1 are not limited to the above relationship. The mounting contact surface 20 can be farther from the pivot axis A1 than the first contact surface 32 in the axial direction D2 if needed and/or desired. The first contact surface 32 can be farther from the mounting contact surface 20 than the second contact surface 34 in the axial direction D2 if needed and/or desired. The first contact surface 32 can be farther from the first mounting contact surface 20A than the second contact surface 34 in the axial direction D2 if needed and/or desired. The first distance DS1 can be longer than or equal to the second distance DS2.

The first contact surface 32 has a first axial length L1 defined in the axial direction D2. The second contact surface 34 has a second axial length L2 defined in the axial direction D2. The mounting contact surface 20 has an axial length L3 defined in an axial direction D2 with respect to the longitudinal center axis 2C of the tubular part 2B of the human-powered vehicle 2 in the mounting state.

In the present embodiment, the axial length L3 of the mounting contact surface 20 is larger than at least one of the first axial length L1 and the second axial length L2. The axial length L3 of the mounting contact surface 20 is larger than the first axial length L1 and the second axial length L2. The first axial length L1 is larger than the second axial length L2. However, the first axial length L1 can be smaller than or equal to the second axial length L2 if needed and/or desired. The axial length L3 can be smaller than or equal to at least one of the first axial length L1 and the second axial length L2 if needed and/or desired.

Figure 6:
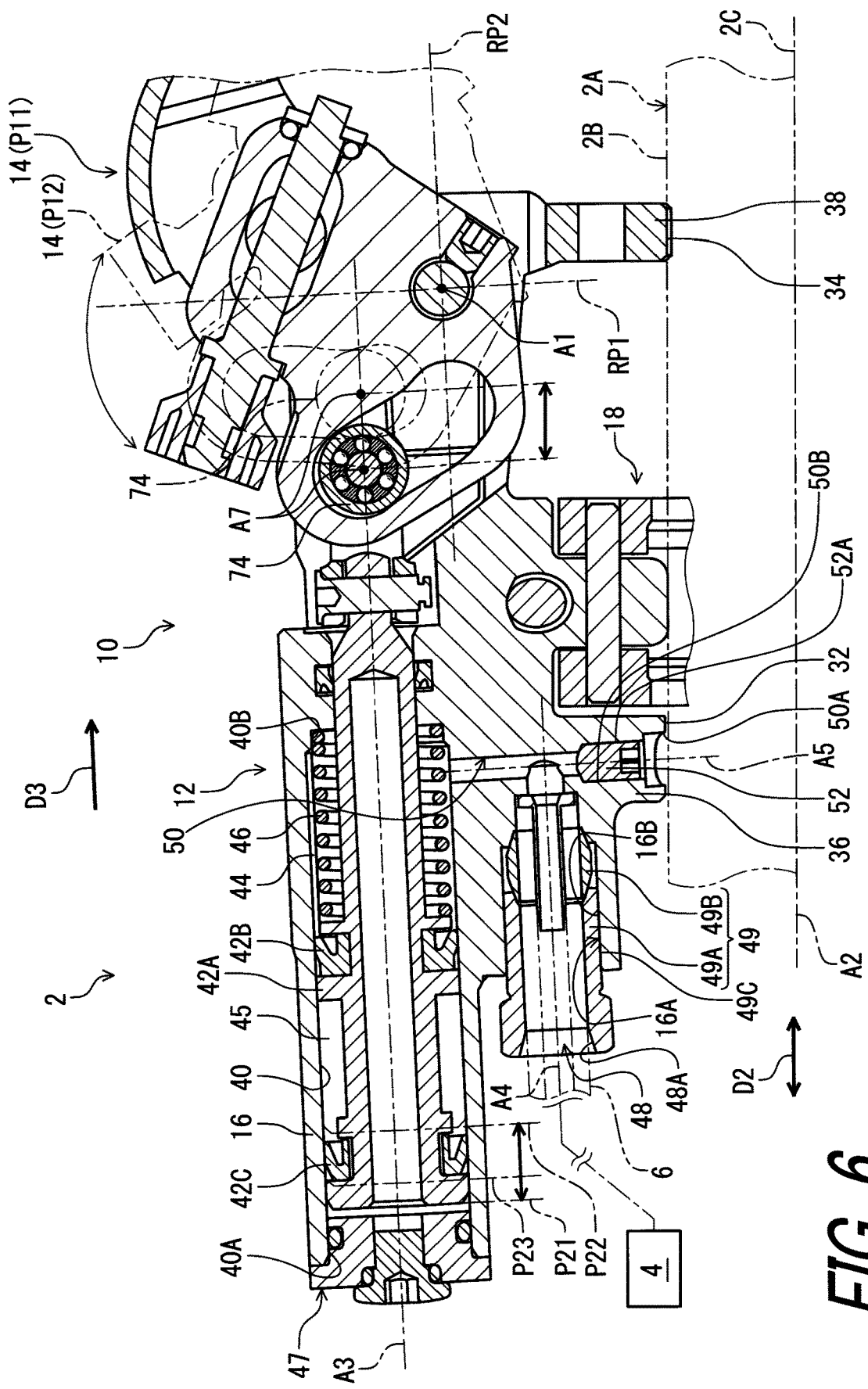
FIG. 6 is a cross-sectional view of the operating device taken along line VI-VI of FIG. 3.

As seen in FIG. 6, the base member 12 includes a first support 36. The first support 36 includes the first contact surface 32. The first support 36 extends from the base body 16 toward the tubular part 2B of the human-powered vehicle 2 in the mounting state.

The base member 12 includes a second support 38. The second support 38 includes the second contact surface 34. The second support 38 extends from the base body 16 toward the tubular part 2B of the human-powered vehicle 2 in the mounting state.

At least one of the first support 36 and the second support 38 is integrally provided with the base body 16 as a one-piece unitary member. In the present embodiment, the first support 36 and the second support 38 are integrally provided with the base body 16 as a one-piece unitary member. However, at least one of the first support 36 and the second support 38 can be a separate member from the base body 16 if needed and/or desired.

The base member 12 includes a cylinder bore 40. The base body 16 includes the cylinder bore 40. The cylinder bore 40 has a cylinder center axis A3. The cylinder bore 40 extends along the cylinder center axis A3. The operating device 10 for the human-powered vehicle 2 comprises a piston 42. The piston 42 is movably provided in the cylinder bore 40. The base member 12 and the piston 42 define a hydraulic chamber 44 in the cylinder bore 40.

The piston 42 is coupled to the operating member 14 to be pulled in a pulling direction D3 in response to a pulling movement of the operating member 14 from the rest position P11 to the operated position P12. The piston 42 is movable relative to the base member 12 from an initial position P21 to an actuated position P22 in response to the pulling movement of the operating member 14. In the present embodiment, the rest position P11 of the operating member 14 corresponds to the initial position P21 of the piston 42. The operated position P12 of the operating member 14 corresponds to the actuated position P22 of the piston 42.

The piston 42 includes a piston body 42A, a first seal 42B, and a second seal 42C. The first seal 42B and the second seal 42C are attached to the piston body 42A. The base member 12, the piston body 42A, and the first seal 42B define the hydraulic chamber 44 in the cylinder bore 40. An intermediate space 45 is defined between the first seal 42B and the second seal 42C in the cylinder bore 40.

The operating device 10 includes a piston biasing member 46. The piston biasing member 46 is provided in the hydraulic chamber 44 to bias the piston 42 toward the initial position P21.

The cylinder bore 40 includes a first end 40A and a second end 40B. The second end 40B is closer to the operating member 14 than the first end 40A. The base member 12 includes a cylinder lid 47. The cylinder lid 47 is attached to the base body 16 to close the first end 40A of the cylinder bore 40. The cylinder center axis A3 extends along the longitudinal center axis 2C of the tubular part 2B of the human-powered vehicle 2 in a mounting state where the base member 12 is mounted to the tubular part 2B of the human-powered vehicle 2.

The cylinder center axis A3 is inclined toward the longitudinal center axis 2C of the tubular part 2B of the human-powered vehicle 2 so that the first end 40A is closer to the tubular part 2B of the human-powered vehicle 2 than the second end 40B in the mounting state where the base member 12 is mounted to the tubular part 2B of the human-powered vehicle 2. However, the cylinder center axis A3 can be parallel to the longitudinal center axis 2C of the tubular part 2B of the human-powered vehicle 2 if needed and/or desired.

The base member 12 includes a hose-attachment hole 48. The hose-attachment hole 48 is configured to be detachably connected with the hydraulic hose 6. The hose-attachment hole 48 is configured to be detachably non-pivotally connected with the hydraulic hose 6. The hose-attachment hole 48 is configured to be in communication with the hydraulic chamber 44.

In the present embodiment, the hose-attachment hole 48 is provided closer to the longitudinal center axis 2C of the tubular part 2B of the human-powered vehicle 2 than the cylinder bore 40 in a mounting state where the base member 12 is mounted to the tubular part 2B of the human-powered vehicle 2. The hose-attachment hole 48 is provided between the cylinder bore 40 and the tubular part 2B of the human-powered vehicle 2 in the mounting state.

However, the hose-attachment hole 48 can be provided closer to the cylinder bore 40 than the longitudinal center axis 2C of the tubular part 2B of the human-powered vehicle 2 in the mounting state where the base member 12 is mounted to the tubular part 2B of the human-powered vehicle 2 if needed and/or desired. The cylinder bore 40 can be provided between the hose-attachment hole 48 and the tubular part 2B of the human-powered vehicle 2 in the mounting state if needed and/or desired.

The hose-attachment hole 48 has a hole center axis A4 and extends along the hole center axis A4. The hydraulic hose 6 extends along the hole center axis A4 of the hose-attachment hole 48 in a state where the hydraulic hose 6 is attached to the hose-attachment hole 48. In the present embodiment, the hole center axis A4 of the hose-attachment hole 48 is defined along the cylinder center axis A3. The hole center axis A4 of the hose-attachment hole 48 is defined to be parallel to the cylinder center axis A3. However, the hole center axis A4 of the hose-attachment hole 48 can be non-parallel to the cylinder center axis A3 if needed and/or desired.

The base member 12 includes a hose-attachment structure 49. The hose-attachment structure 49 includes at least part of the hose-attachment hole 48. The base body 16 includes an attachment hole 16A. The hose-attachment structure 49 is attached to the attachment hole 16A. The hose-attachment structure 49 is configured to detachably connect the hydraulic hose 6 to the base body 16.

The hose-attachment structure 49 includes a sleeve 49A and a tubular bushing 49B. The sleeve 49A includes an external thread 49C. The attachment hole 16A includes a threaded hole 16B. The external thread 49C of the sleeve 49A is threadedly engaged with the threaded hole 16B. The sleeve 49A and the tubular bushing 49B are provided in the attachment hole 16A in a state where the hydraulic hose 6 is attached to the hose-attachment hole 48. The tubular bushing 49B can also be referred to as an olive.

Tightening the sleeve 49A deforms the tubular bushing 49B to decrease an inner diameter of the tubular bushing 49B, attaching firmly the tubular bushing 49B to the hydraulic hose 6. Thus, the hydraulic hose 6 is firmly connected to the hose-attachment hole 48.

The base member 12 includes an intermediate hole 50. The intermediate hole 50 extends from the cylinder bore 40 toward the tubular part 2B of the human-powered vehicle 2 in the mounting state. The intermediate hole 50 is configured to be in communication with the hydraulic chamber 44. The intermediate hole 50 extends from the cylinder bore 40 toward the first contact surface 32. The intermediate hole 50 is at least partially provided in the first support 36. The intermediate hole 50 includes an end opening 50A provided on the first contact surface 32. The intermediate hole 50 extends from the cylinder bore 40 to the end opening 50A. In the present embodiment, the intermediate hole 50 is partially provided in the first support 36. However, the intermediate hole 50 can be entirely provided in the first support 36.

The base member 12 includes a seal member 52. The seal member 52 is provided in the intermediate hole 50 to close the intermediate hole 50. The seal member 52 is provided between the cylinder bore 40 and the end opening 50A. The seal member 52 is a separate member from the base body 16. The seal member 52 includes an external thread 52A. The intermediate hole 50 includes a threaded hole 50B. The external thread 52A of the seal member 52 is engaged with the threaded hole 50B of the intermediate hole 50. However, the seal member 52 can be integrally provided with the base body 16 as a one-piece unitary member if needed and/or desired.

The hose-attachment hole 48 is configured to be in communication with the intermediate hole 50. The hose-attachment hole 48 includes an outlet end opening 48A. The hose-attachment hole 48 extends from the intermediate hole 50 to the outlet end opening 48A along the cylinder center axis A3. The hose-attachment hole 48 extends from the outlet end opening 48A to the intermediate hole 50 in the pulling direction D3. The hose-attachment hole 48 extends from the intermediate hole 50 along the cylinder center axis A3. The hose-attachment hole 48 extends from the intermediate hole 50 along the axial direction D2. The hose-attachment hole 48 extends from the intermediate hole 50 away from the mounting contact surface 20 along the axial direction D2. However, the positional relationships among the hose-attachment hole 48, the intermediate hole 50, the mounting contact surface 20 are not limited to the above positional relationship.

The intermediate hole 50 has a longitudinal axis A5. The longitudinal axis A5 of the intermediate hole 50 is non-parallel to the hole center axis A4 of the hose-attachment hole 48. The longitudinal axis A5 of the intermediate hole 50 intersects with the hole center axis A4 of the hose-attachment hole 48. The longitudinal axis A5 of the intermediate hole 50 is perpendicular to the hole center axis A4 of the hose-attachment hole 48. However, the longitudinal axis A5 of the intermediate hole 50 can be non-perpendicular to the hole center axis A4 of the hose-attachment hole 48.

Figure 7:
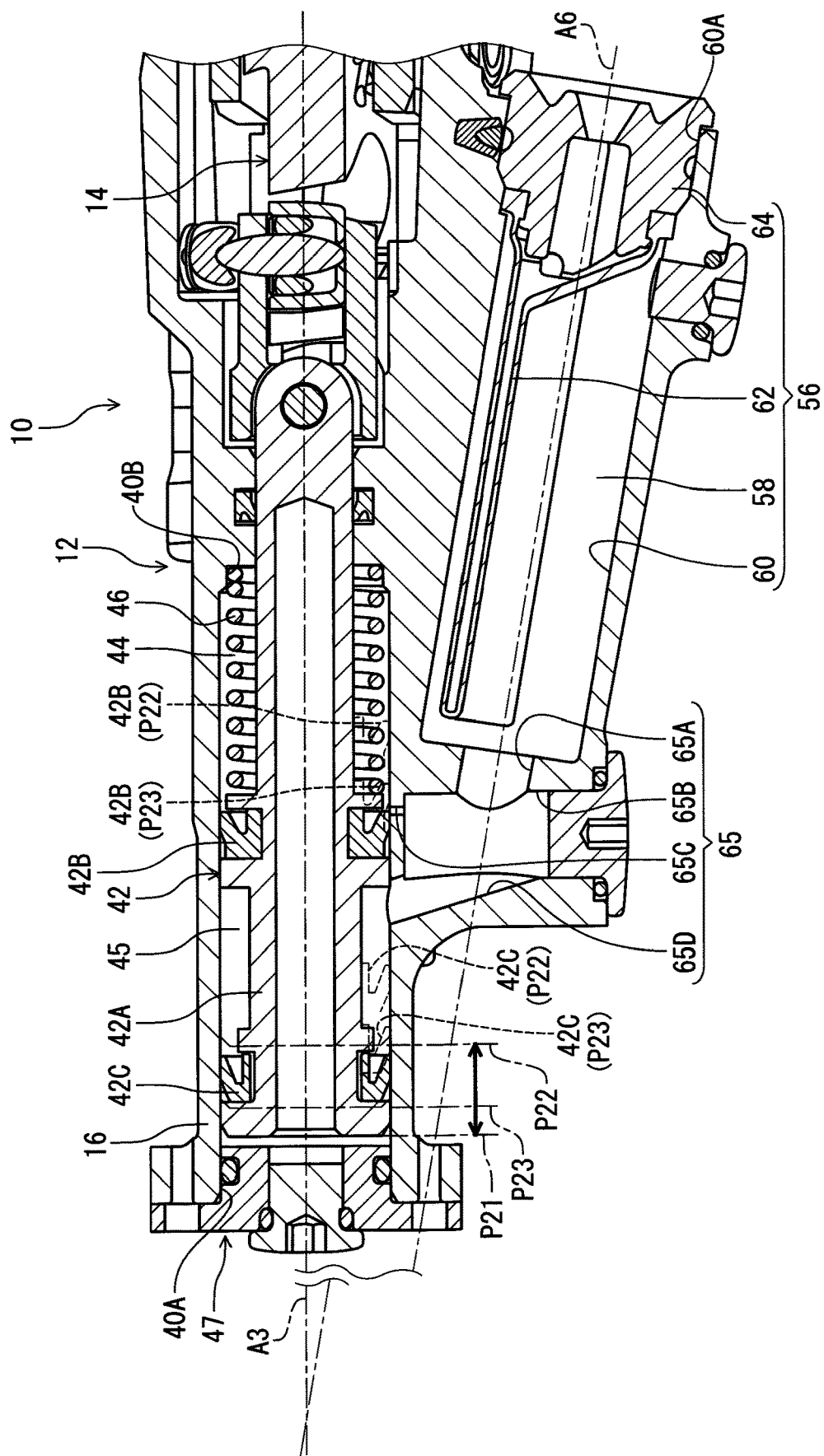
FIG. 7 is a cross-sectional view of the operating device taken along line VII-VII of FIG. 3.

As seen in FIG. 7, the operating device 10 further comprises a reservoir 56. The reservoir 56 includes a reservoir chamber 58. The reservoir chamber 58 is configured to be in communication with the hydraulic chamber 44. The base member 12 includes a reservoir recess 60 including a recess end opening 60A. The reservoir recess 60 has a longitudinal axis A6 and extends along the longitudinal axis A6. The longitudinal axis A6 of the reservoir recess 60 is non-parallel to the cylinder center axis A3. The longitudinal axis A6 of the reservoir recess 60 is inclined relative to the cylinder center axis A3. The longitudinal axis A6 of the reservoir recess 60 intersects with the cylinder center axis A3 to define an imaginary plane. The longitudinal axis A6 of the reservoir recess 60 is not provided in a skew position with respect to the cylinder center axis A3. However, the longitudinal axis A6 of the reservoir recess 60 can be parallel to the cylinder center axis A3 if needed and/or desired. The longitudinal axis A6 of the reservoir recess 60 can be provided in a skew position with respect to the cylinder center axis A3 if needed and/or desired.

The reservoir 56 includes a diaphragm 62 and a lid 64. The diaphragm 62 is provided in the reservoir recess 60. The diaphragm 62 is made of an elastic material such as elastomer (e.g., rubber). The lid 64 is attached to the base member 12 to close the end opening 50A. The diaphragm 62 is held between the base member 12 and the lid in a state where the lid is attached to the base member 12. The base member 12 and the diaphragm 62 define the reservoir chamber 58.

The base body 16 includes an intermediate passageway 65. The intermediate passageway 65 is configured to connect the hydraulic chamber 44 to the reservoir chamber 58. The intermediate passageway 65 includes a first hole 65A, a second hole 65B, a primary port 65C, and a secondary port 65D. The first hole 65A connects the reservoir chamber 58 to the second hole 65B. The primary port 65C connects the second hole 65B to the cylinder bore 40. The secondary port 65D connects the second hole 65B to the cylinder bore 40.

The primary port 65C is configured to be connected to the hydraulic chamber 44 in an initial state where the piston is in the initial position P21. The secondary port 65D is configured not to be connected to the hydraulic chamber 44 in the initial state.

The first seal 42B is provided between the primary port 65C and the secondary port 65D in the initial state. The secondary port 65D is provided between the first seal 42B and the second seal 42C in the initial state. Thus, the reservoir chamber 58 is in communication with the hydraulic chamber 44 and the intermediate space 45 in the initial state so as to absorb a change in pressure in the hydraulic chamber 44.

The piston 42 is movable relative to the base member 12 from the initial position P21 toward the actuated position P22 through an intermediate position P23. The initial position P21 is closer to the intermediate position P23 than the actuated position P22. The first seal 42B is configured to interrupt the connection between the hydraulic chamber 44 and the primary port 65C in an intermediate state where the piston 42 is in the intermediate position P23. Thus, the hydraulic chamber 44 is not in communication with the reservoir chamber 58 and the intermediate space 45 to supply a hydraulic pressure in a state where the piston 42 is in a position between the intermediate position P23 and the actuated position P22.

Figure 8:
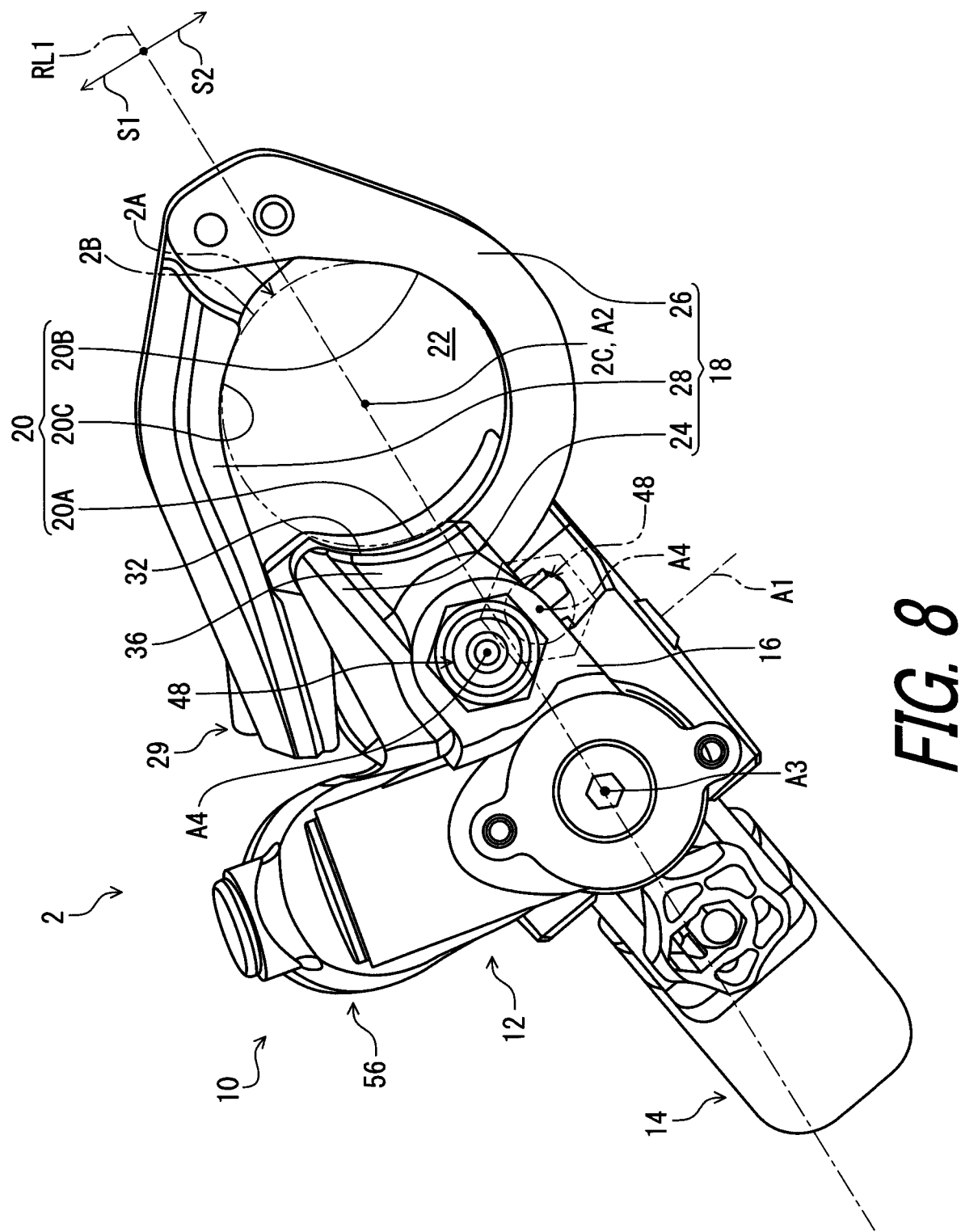
FIG. 8 is a side elevational view of the operating device illustrated in FIG. 1.

As seen in FIG. 8, the hole center axis A4 of the hose-attachment hole 48 is offset, as viewed along the cylinder center axis A3, from a reference line RL1 extending through the cylinder center axis A3 and the longitudinal center axis 2C of the tubular part 2B of the human-powered vehicle 2 in the mounting state.

The reservoir 56 is provided on a first side S1 of the reference line RL1 as viewed along the cylinder center axis A3 in the mounting state. The hole center axis A4 of the hose-attachment hole 48 is provided on the first side S1 of the reference line RL1 as viewed along the cylinder center axis A3 in the mounting state. As indicated with a long-dashed double-dotted line in FIG. 8, however, the hole center axis A4 of the hose-attachment hole 48 is provided on a second side S2 of the reference line RL1 as viewed along the cylinder center axis A3 in the mounting state. The second side S2 is provided on an opposite side of the first side S1 with respect to the reference line RL1 as viewed along the cylinder center axis A3 in the mounting state.

The hose-attachment hole 48 is provided between the reservoir 56 and the tubular part 2B of the human-powered vehicle 2 as viewed along the cylinder center axis A3 in the mounting state. The reservoir 56 is provided above the reference line RL1 as viewed along the cylinder center axis A3 in the mounting state. However, the reservoir 56 can be provided on or below the reference line RL1 if needed and/or desired.

As seen in FIG. 2, the longitudinal axis A6 of the reservoir recess 60 is at least partially provided between the cylinder center axis A3 and the hole center axis A4 as viewed along the pivot axis A1. The longitudinal axis of the reservoir recess 60 is inclined relative to the cylinder center axis A3 and the hole center axis A4 as viewed along the pivot axis A1.

Figure 9:
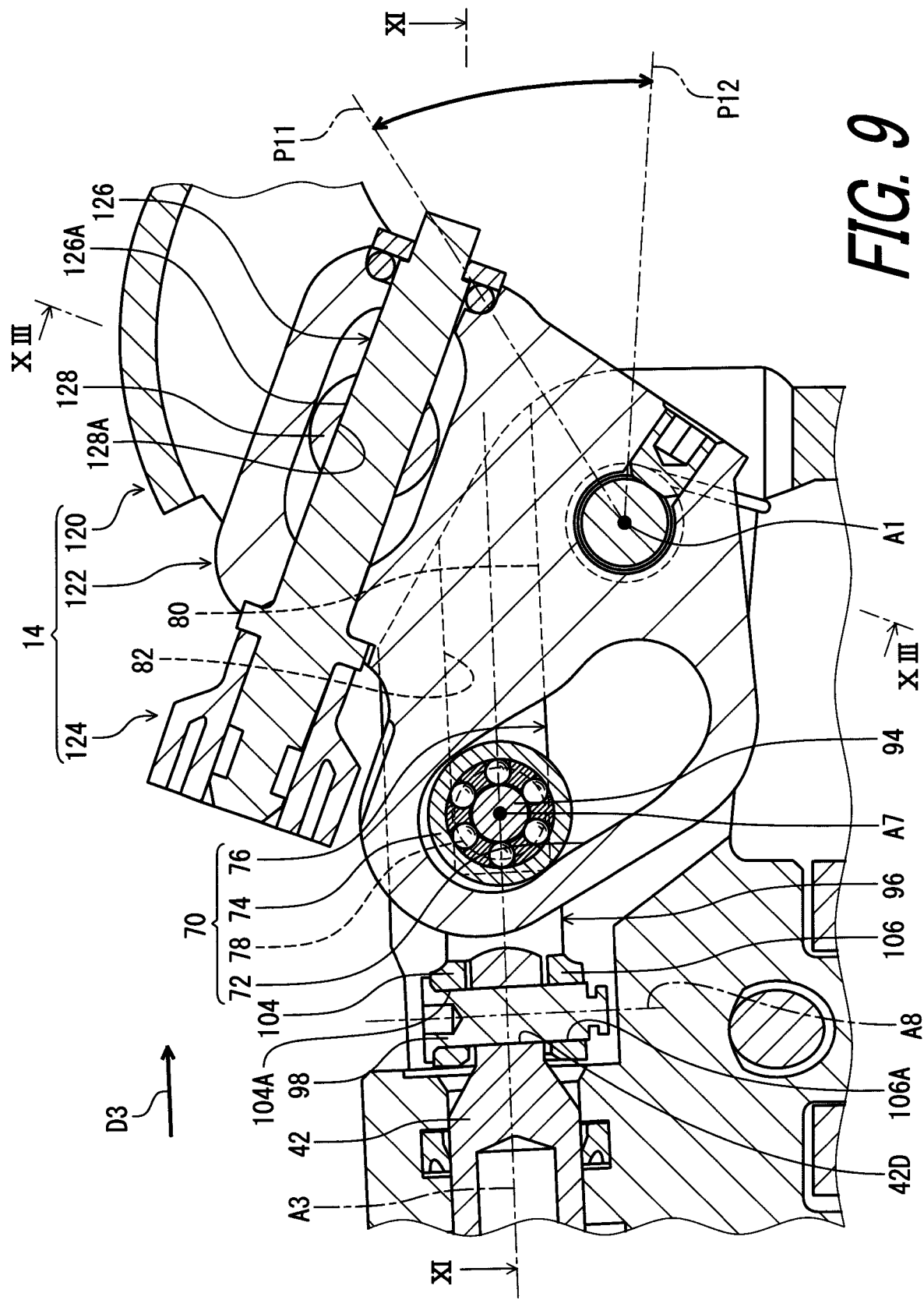
FIG. 9 is a cross-sectional view of the operating device taken along line IX-IX of FIG. 3.

As seen in FIG. 9, the operating device 10 for the human-powered vehicle 2 comprises a coupling structure 70. The coupling structure 70 is configured to couple the operating member 14 to the piston 42 to transmit the pulling movement to the piston 42.

The operating member 14 includes a cam surface 72. The coupling structure 70 includes a follower 74. The follower 74 is configured to be in contact with the cam surface 72 to receive the pulling movement.

The base member 12 includes a guide groove 76. The coupling structure 70 includes a guided part 78. The guided part 78 is movably provided in the guide groove 76 to move the follower 74 in the pulling direction D3. The guide groove 76 linearly extends in the pulling direction D3. The base member 12 includes a first guide surface 80 and a second guide surface 82. The first guide surface 80 and the second guide surface 82 define the guide groove 76. The first guide surface 80 linearly extends in the pulling direction D3. The second guide surface 82 linearly extends in the pulling direction D3. The guided part 78 is provided between the first guide surface 80 and the second guide surface 82. The guided part 78 is contactable with the first guide surface 80 and the second guide surface 82.

Figure 10:
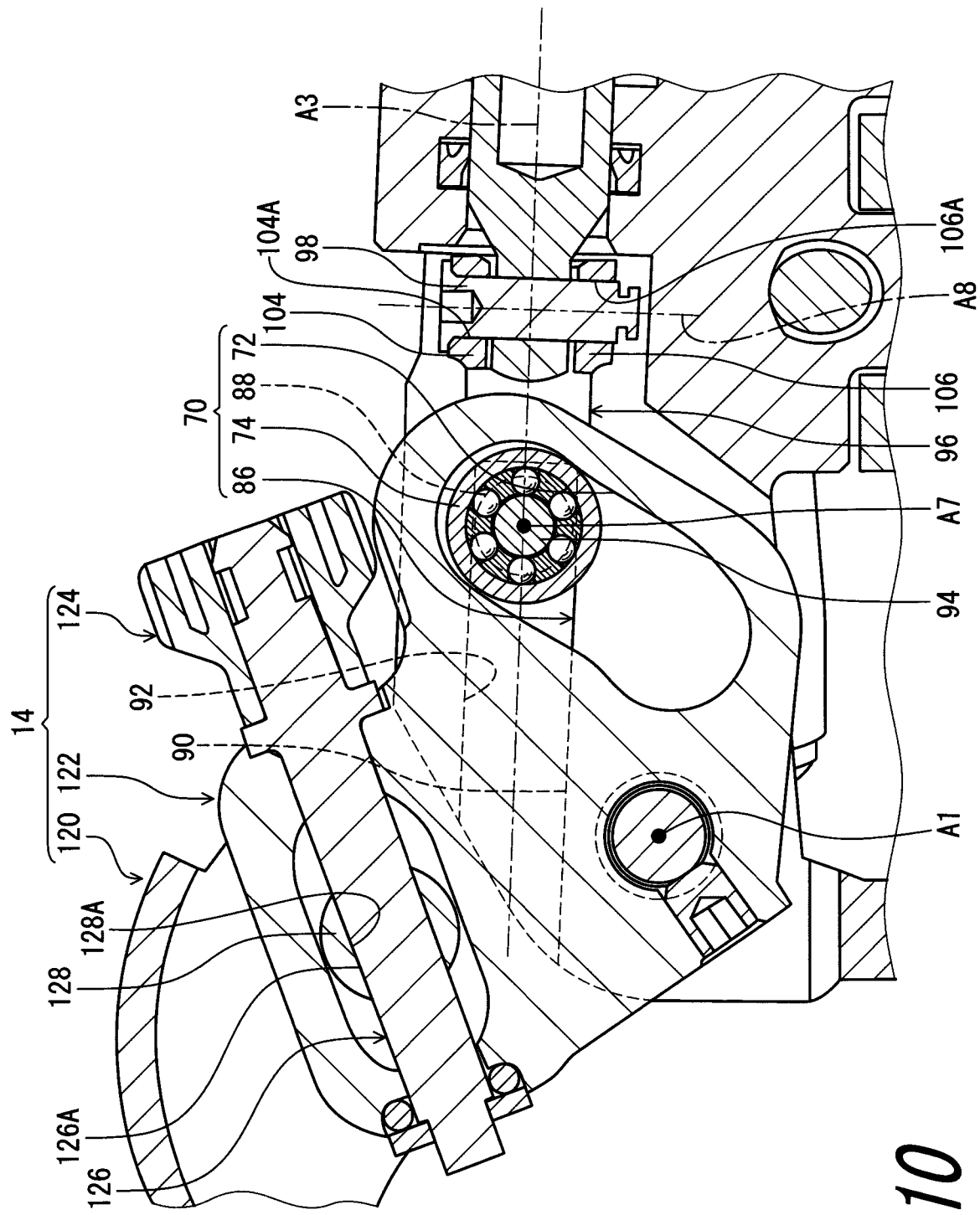
FIG. 10 is a cross-sectional view of the operating device taken along line X-X of FIG. 3.

As seen in FIG. 10, the base member 12 includes a guide groove 86. The coupling structure 70 includes a guided part 88. The guided part 88 is movably provided in the guide groove 86 to move the follower 74 in the pulling direction D3. The guide groove 86 linearly extends in the pulling direction D3. The base member 12 includes a first guide surface 90 and a second guide surface 92. The first guide surface 90 and the second guide surface 92 define the guide groove 86. The first guide surface 90 linearly extends in the pulling direction D3. The second guide surface 92 linearly extends in the pulling direction D3. The guided part 88 is provided between the first guide surface 90 and the second guide surface 92. The guided part 88 is contactable with the first guide surface 90 and the second guide surface 92.

Figure 11:
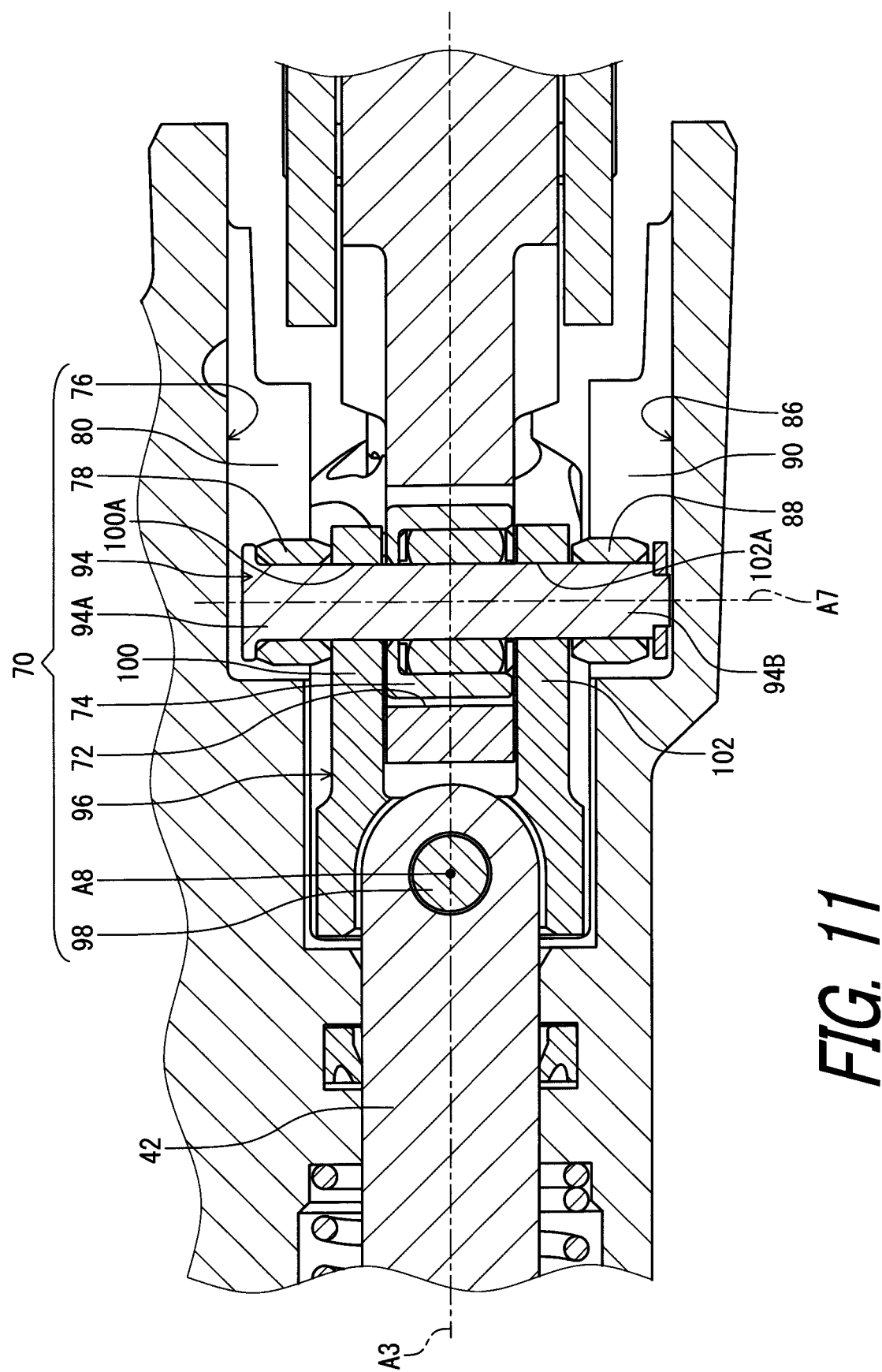
FIG. 11 is a cross-sectional view of the operating device taken along line XI-XI of FIG. 9.

As seen in FIG. 11, at least one of the follower 74 and the guided part 78 and/or 88 is rotatably coupled to the piston 42 about a rotational axis A7. The follower 74 and the guided parts 78 and 88 are rotatably coupled to the piston 42 about the rotational axis A7. The coupling structure 70 includes a support pin 94. The support pin 94 is configured to rotatably support the at least one of the follower 74 and the guided part 78 and/or 88 about the rotational axis A7.

In the present embodiment, the support pin 94 is configured to rotatably support the follower 74 and the guided parts 78 and 88 about the rotational axis A7. The support pin 94 includes a first pin end 94A and a second pin end 94B. The support pin 94 extends along the rotational axis A7 between the first pin end 94A and the second pin end 94B. The guided part 78 is configured to be rotatably support by the first pin end 94A. The guided part 78 is configured to be rotatably support by the second pin end 94B. The guided part 78 is spaced apart from the guided part 78. The follower 74 is provided between the guided parts 78 and 88.

The coupling structure 70 includes an intermediate member 96. The intermediate member 96 is pivotally coupled to the piston 42 about a piston pivot axis A8. The coupling structure 70 includes a coupling pin 98. The coupling pin 98 is configured to pivotally couple the intermediate member 96 to the piston 42 about the piston pivot axis A8.

At least one of the follower 74 and the guided part 78 and/or 88 is rotatably coupled to the intermediate member 96 about the rotational axis A7. The follower 74 and the guided parts 78 and 88 are rotatably coupled to the intermediate member 96 about the rotational axis A7. However, at least one of the follower 74 and the guided parts can be rotatably coupled to the intermediate member 96 about the rotational axis A7 if needed and/or desired.

The intermediate member 96 includes a first part 100 and a second part 102. The first part 100 includes a first hole 100A. The second part 102 includes a second hole 102A. The support pin 94 extends through the first hole 100A and the second hole 102A. The first part 100 is spaced apart from the second part 102. The follower 74 is provided between the first part 100 and the second part 102. The first part 100, the follower 74, and the second part 102 are provided between the guided parts 78 and 88.

As seen in FIG. 9, the intermediate member 96 includes a first coupling part 104 and a second coupling part 106. The first coupling part 104 includes a first coupling hole 104A. The second coupling part 106 includes a second coupling hole 106A. The piston 42 includes a third coupling hole 42D. The coupling pin 98 extends through the first coupling hole 104A, the second coupling hole 106A, and the third coupling hole 42D.

The piston pivot axis A8 intersects with the cylinder center axis A3 as viewed along the rotational axis A7. In the present embodiment, the piston pivot axis A8 is perpendicular to the cylinder center axis A3 as viewed along the rotational axis A7. However, the piston pivot axis A8 can be non-perpendicular to the cylinder center axis A3 as viewed along the rotational axis A7 if needed and/or desired.

As seen in FIGS. 9 and 10, at least one of the follower 74 and the guided part 78 and/or 88 is provided to overlap with the cylinder center axis A3 as viewed along the rotational axis A7. In the present embodiment, the follower 74 and the guided parts 78 and 88 are provided to overlap with the cylinder center axis A3 as viewed along the rotational axis A7. However, at least one of the follower 74 and the guided parts 78 and 88 can be offset from the cylinder center axis A3 as viewed along the rotational axis A7 if needed and/or desired.

Figure 12:
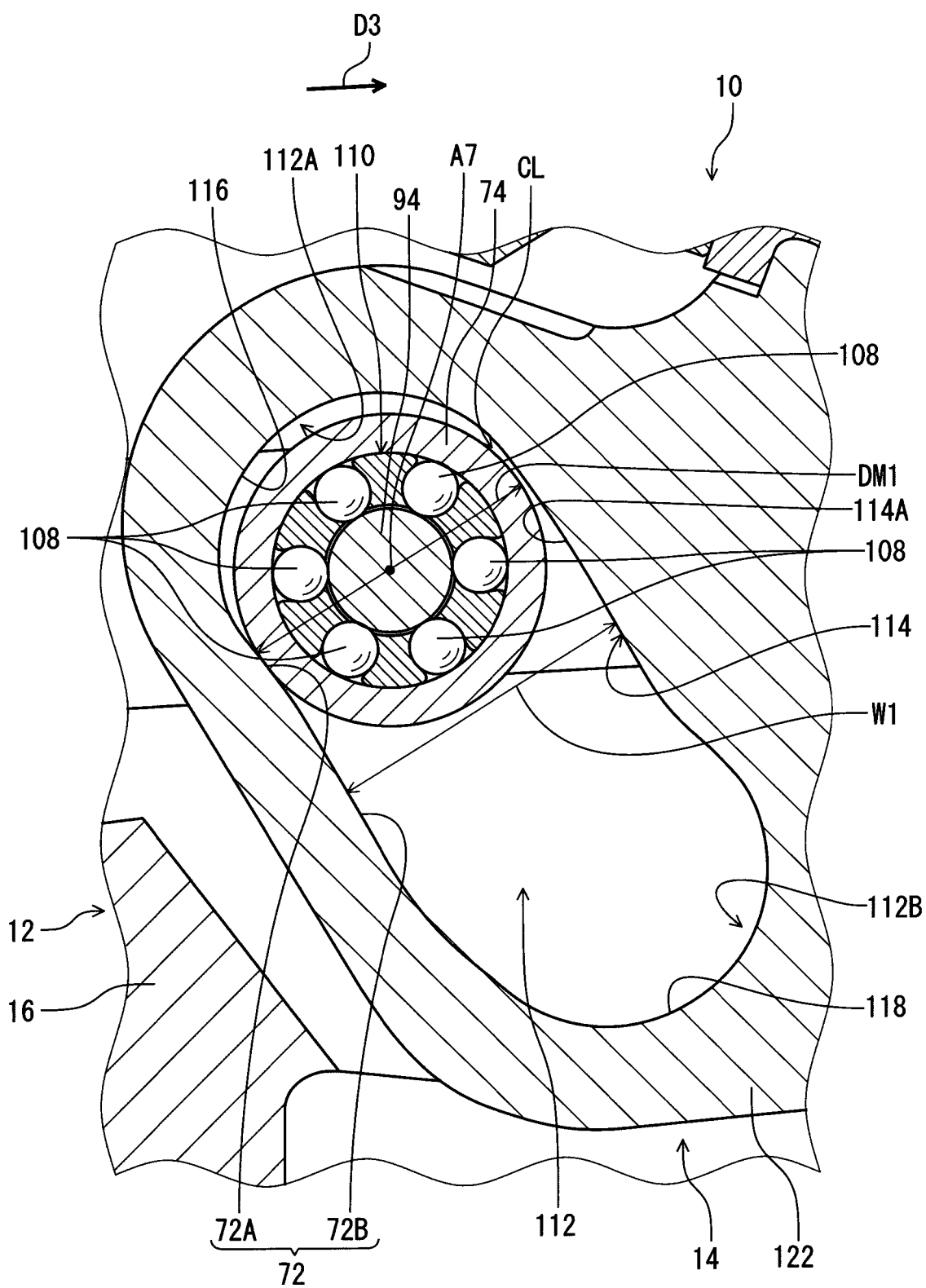
FIG. 12 is an enlarged partial cross-sectional view of the operating device illustrated in FIG. 9.

As seen in FIG. 12, the coupling structure 70 includes a plurality of rollers 108 and a retainer 110. The plurality of rollers 108 and the retainer 110 are provided between the follower 74 and the support pin 94. The retainer 110 is configured to rotatably support the plurality of rollers 108.

The cam surface 72 includes a curved surface 72A. The curved surface 72A is contactable with the follower 74. The curved surface 72A has a curved convex shape as viewed along the rotational axis A7. The operating member 14 includes a cam groove 112. The cam surface 72 partially defines the cam groove 112. The follower 74 is movably provided in the cam groove 112. The operating member 14 includes an additional cam surface 114. The additional cam surface 114 is contactable with the follower 74. The cam surface 72 and the additional cam surface 114 at least partially define the cam groove 112. The cam groove 112 is provided between the cam surface 72 and the additional cam surface 114.

The curved surface 72A has the curved convex such that the curved surface 72A approaches the additional cam surface 114. The curved surface 72A has the curved shape such that the curved surface 72A protrudes in the pulling direction D3.

The cam surface 72 includes a flat surface 72B. The flat surface 72B is contactable with the follower 74. The flat surface 72B is continuously connected with the curved surface 72A.

The additional cam surface 114 includes an additional curved surface 114A as viewed along the rotational axis A7. However, the additional cam surface 114 can include surfaces having other shapes such as a flat shape.

The cam groove 112 includes a first closed end 112A and a second closed end 112B. The operating member 14 includes a first end surface 116 and a second end surface 118. The first end surface 116 defines the first closed end 112A. The second end surface 118 defines the second closed end 112B. The cam surface 72, the additional cam surface 114, the first end surface 116, and the second end surface 118 define the cam groove 112. At least one of the first end surface 116 and the second end surface 118 can be omitted from the operating member 14 if needed and/or desired. At least one of the first closed end 112A and the second closed end 112B can be omitted from the cam groove 112 if needed and/or desired.

In the present embodiment, the first end surface 116 is closer to the curved surface 72A of the cam surface 72 than the second end surface 118. The first end surface 116 is closer to the follower 74 than the second end surface 118 in a rest state where the operating member 14 is in the rest position P11. The follower 74 is in contact with the curved surface 72A of the cam surface 72 in the rest state where the operating member 14 is in the rest position P11.

The cam groove 112 has a width W1. The follower 74 has an outer diameter DM1. In the present embodiment, the width W1 of the cam groove 112 is larger than the outer diameter DM1 of the follower 74. A clearance CL is provided between the additional cam surface 114 and the follower 74. The clearance CL is smaller than or equal to a predetermined clearance. However, the width W1 of the cam surface 72 can be equal to the outer diameter DM1 of the follower 74 if needed and/or desired. The clearance CL can be larger than the predetermined clearance or can be equal to zero.

As seen in FIG. 9, the operating member 14 includes a first operating member 120, a second operating member 122, and an adjustment structure 124. The first operating member 120 is pivotally coupled to the base member 12 about the pivot axis A1. The second operating member 122 is pivotally coupled to the base member 12 and the first operating member 120 about the pivot axis A1.

The adjustment structure 124 is configured to change a relative position between the first operating member 120 and the second operating member 122 about the pivot axis A1. The adjustment structure 124 includes an adjustment bolt 126 and an adjustment nut 128. The adjustment bolt 126 is rotatably attached to the second operating member 122. The adjustment nut 128 is pivotally attached to the first operating member 120. The adjustment nut 128 includes a threaded hole 128A. The adjustment bolt 126 includes an external thread 126A configured to be threadedly engaged with the threaded hole 128A. Rotation of the adjustment bolt 126 changes the relative position between the first operating member 120 and the second operating member 122 about the pivot axis A1. Thus, the adjustment structure 124 is configured to change the rest position P11 of the operating member 14 relative to the base member 12.

Figure 13:
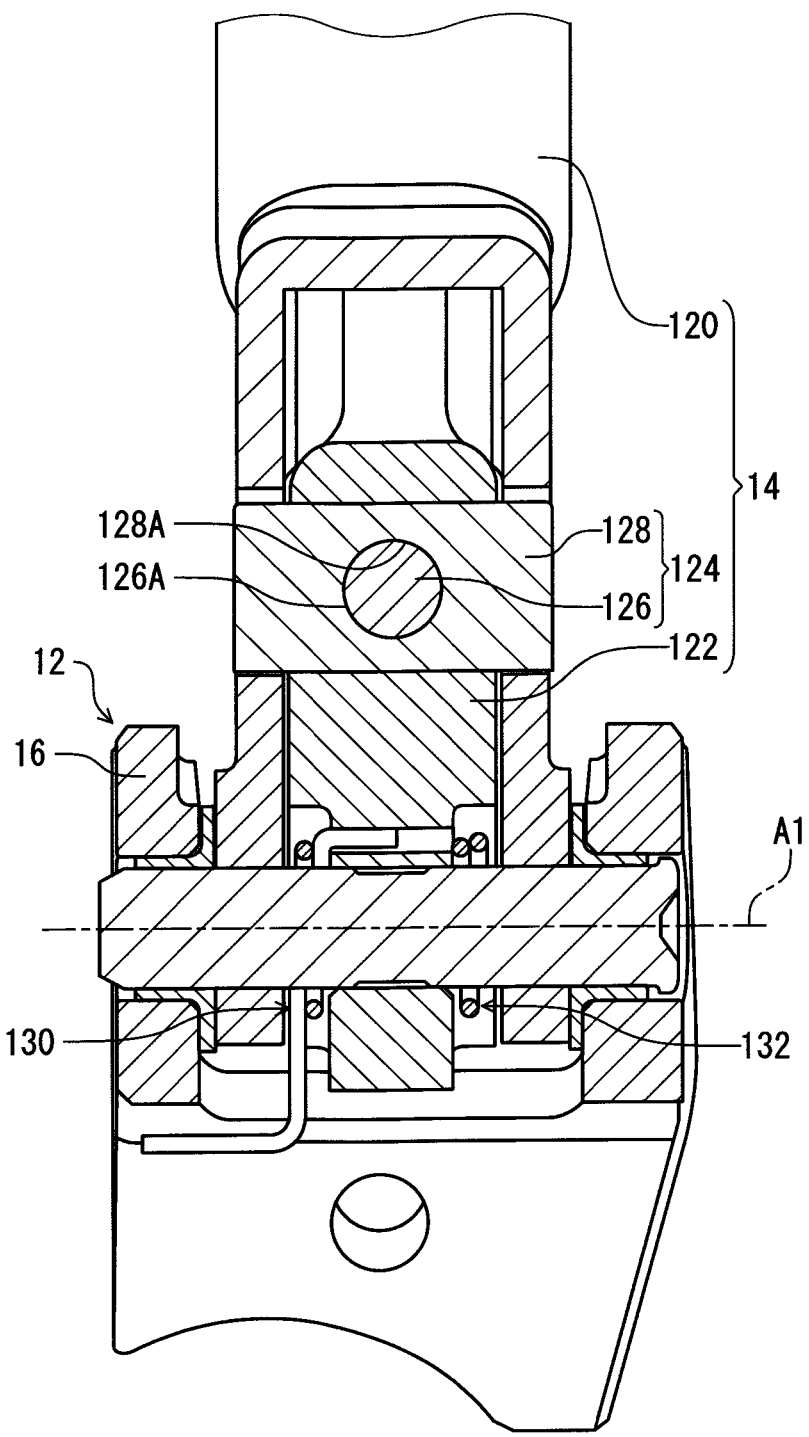
FIG. 13 is a cross-sectional view of the operating device taken along line XIII-XIII of FIG. 9.

As seen in FIG. 13, the operating device 10 comprises a first biasing member 130 and a second biasing member 132. The first biasing member 130 is configured to bias one of the first operating member 120 and the second operating member 122 relative to the base member 12 about the pivot axis A1 toward the operated position P12 (see e.g., FIG. 9). biasing force of the first biasing member 130 is smaller than a biasing force of the piston biasing member 46 (see e.g., FIG. 6). Thus, the biasing force of the first biasing member 130 presses the cam surface 72 against the follower 74 without moving the piston 42 toward the actuated position P22 (see e.g., FIG. 9). The second biasing member 132 is configured to bias the first operating member 120 relative to the second operating member 122 about the pivot axis A1. A biasing force of the second biasing member 132 can stabilize the relative position between the first operating member 120 and the second operating member 122.

Figure 14:
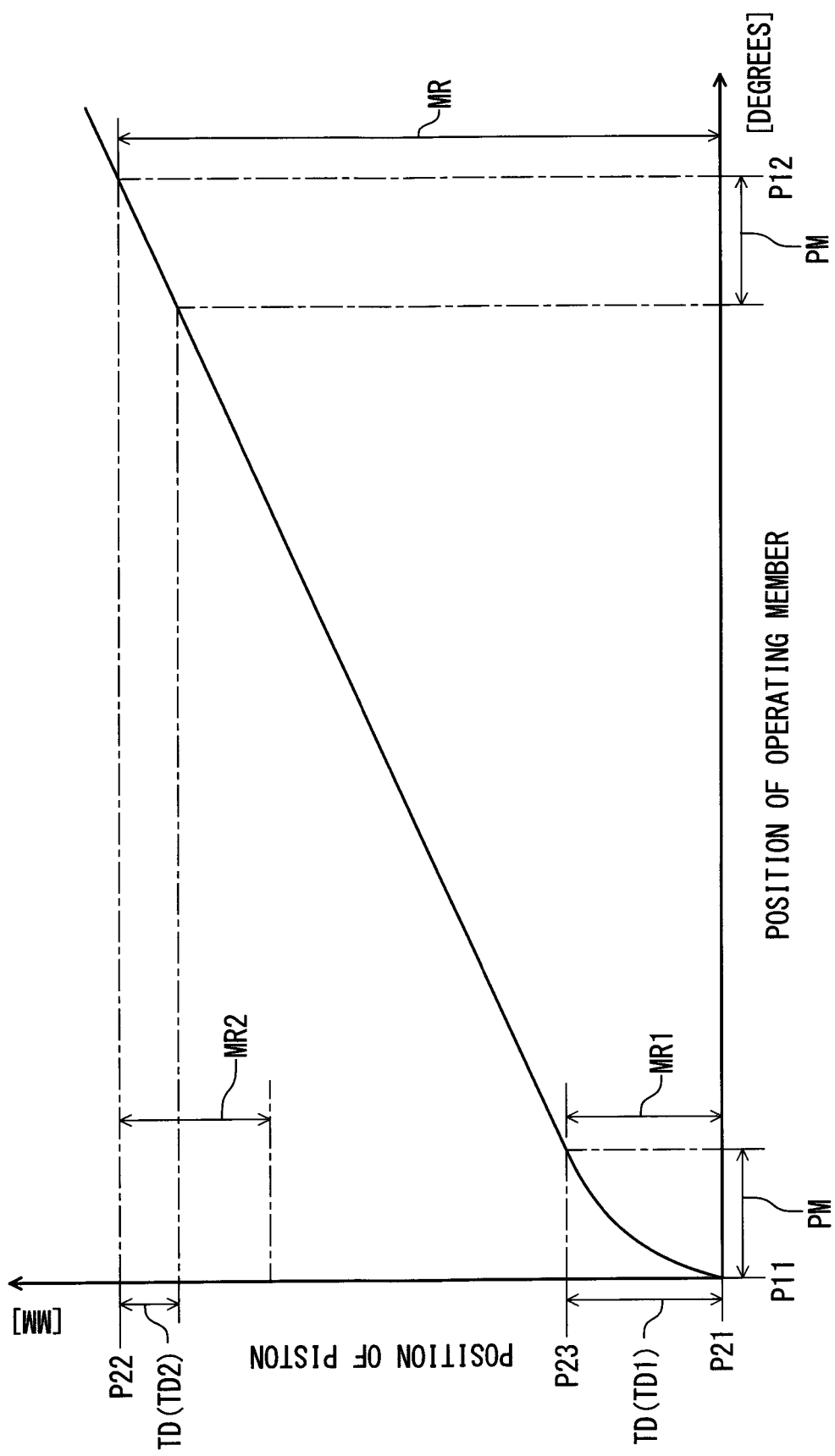
FIG. 14 is a graph showing a relationship between a position of a piton and a position of an operating member in the operating device illustrated in FIG. 1.

As seen in FIG. 14, the cam surface 72 is configured to change a travel distance TD of the piston 42 per unit amount PM of the pulling movement of the operating member 14. The cam surface 72 is configured to change the travel distance TD of the piston 42 per unit amount PM of a pivotal movement of the operating member 14 about the pivot axis A1. The cam surface 72 is configured to change the travel distance TD of the piston 42 per unit amount PM of a pivot angle of the operating member 14 about the pivot axis A1.

The piston 42 has a movable range MR defined between the initial position P21 and the actuated position P22. The movable range MR of the piston 42 includes a first movable range MR1 and a second movable range MR2. The first movable range MR1 is closer to the initial position P21 than the second movable range MR2. The second movable range MR2 is closer to the actuated position P22 than the first movable range MR1. The first movable range MR1 has a distance equal to a distance of the second movable range MR2.

As seen in FIGS. 6 and 14, the cam surface 72 is configured to move the piston 42 by a first travel distance TD1 per unit amount PM of the pulling movement of the operating member 14 in the first movable range MR1. The cam surface 72 is configured to move the piston 42 by a second travel distance TD2 per unit amount PM of the pulling movement of the operating member 14 in the second movable range MR2. The first travel distance TD1 is different from the second travel distance TD2. In the present embodiment, the first travel distance TD1 is longer than the second travel distance TD2. However, the first travel distance TD1 can be smaller than or equal to the second travel distance TD2 if needed and/or desired.

As seen in FIG. 6, the rotational axis A7 is movable to not pass through a first reference plane RP1 perpendicular to the cylinder center axis A3. The first reference plane RP1 extends through the pivot axis A1 of the operating member 14. The follower 74 is movable to not pass through the first reference plane RP1. The rotational axis A7 is movable only within a region RG defined by the first reference plane RP1 and a second reference plane RP2 perpendicular to the first reference plane RP1. The second reference plane RP2 extends through the pivot axis A1 of the operating member 14. The follower 74 is movable only within the region RG. The cylinder bore 40 is provided in the region RG.

However, the follower 74 can be configured to pass through the first reference plane RP1 if needed and/or desired. The rotational axis A7 can be movable outside the region RG if needed and/or desired. The follower 74 can be movable outside the region RG if needed and/or desired.

As seen in FIG. 2, a first rotational force F11 is applied to the base member 12 about the mounting part 18 when a first force F12 is applied to the operating member 14. The first contact surface 32 comes into contact with the tubular part 2B of the human-powered vehicle 2 when the first rotational force F11 is applied to the base member 12. Thus, the first contact surface 32 can reduce influence caused by the first force F12 applied to the operating member 14.

A second rotational force F21 is applied to the base member 12 about the mounting part 18 when a second force F22 is applied to the operating member 14. The second contact surface 34 comes into contact with the tubular part 2B of the human-powered vehicle 2 when the second rotational force F21 is applied to the base member 12. Thus, the second contact surface 34 can reduce influence caused by the second force F22 applied to the operating member 14.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. An operating device for a human-powered vehicle, comprising:
   a base member including
      a base body, and
      a mounting part configured to couple the base body to a tubular part of the human-powered vehicle, at least part of the mounting part being integrally provided with the base body as a one-piece unitary member; and
   an operating member movably coupled to the base body, the mounting part including a mounting contact surface contactable with the tubular part of the human-powered vehicle in a mounting state where the mounting part couples the base body to the tubular part of the human-powered vehicle, the mounting part including a mounting opening having an opening center axis defined along a longitudinal center axis of the tubular part of the human-powered vehicle in the mounting state,
   the base member including
      a first contact surface contactable with the tubular part of the human-powered vehicle in the mounting state, the first contact surface being spaced apart from the mounting contact surface in an axial direction with respect to the opening center axis, and
      a second contact surface contactable with the tubular part of the human-powered vehicle in the mounting state, the second contact surface being spaced apart from the mounting contact surface and the first contact surface in the axial direction, and
   the mounting contact surface being provided between the first contact surface and the second contact surface in the axial direction.

2. The operating device according to claim 1, wherein the base member includes
   a cylinder bore, and
   an intermediate hole extending from the cylinder bore toward the first contact surface.

3. The operating device according to claim 2, wherein
the base member includes a first support including the first contact surface, the first support extending from the base body toward the tubular part of the human-powered vehicle in the mounting state, and
the intermediate hole is at least partially provided in the first support.

4. The operating device according to claim 2, wherein
the intermediate hole includes an end opening provided on the first contact surface and extends from the cylinder bore to the end opening.

5. The operating device according to claim 4, wherein
the base member includes a seal member provided in the intermediate hole to close the intermediate hole.

6. The operating device according to claim 5, wherein
the seal member is provided between the cylinder bore and the end opening.

7. The operating device according to claim 2, wherein
the base member includes a hose-attachment hole configured to be detachably connected with a hydraulic hose, and
the hose-attachment hole is configured to be in communication with the intermediate hole.

8. The operating device according to claim 7, wherein
the cylinder bore has a cylinder center axis and extends the cylinder center axis, and
the hose-attachment hole extends from the intermediate hole along the cylinder center axis.

9. The operating device according to claim 7, wherein
the hose-attachment hole extends from the intermediate hole along the axial direction.

10. The operating device according to claim 7, wherein
the hose-attachment hole extends from the intermediate hole away from the mounting contact surface along the axial direction.

11. The operating device according to claim 2, further comprising
a piston movably provided in the cylinder bore, wherein
the operating member is movable relative to the base member between a rest position and an operated position, and
the piston is coupled to the operating member to be pulled in a pulling direction in response to a pulling movement of the operating member from the rest position to the operated position.

12. The operating device according to claim 1, wherein
the base member includes
a first support including the first contact surface, the first support extending from the base body toward the tubular part of the human-powered vehicle in the mounting state, and
a second support including the second contact surface, the second support extending from the base body toward the tubular part of the human-powered vehicle in the mounting state.

13. The operating device according to claim 12, wherein
at least one of the first support and the second support is integrally provided with the base body as a one-piece unitary member.

14. The operating device according to claim 1, wherein
the mounting part includes a first mounting portion and a second mounting portion,
the first mounting portion is integrally provided with the base body as a one-piece unitary member,
the second mounting portion is pivotally coupled to the first mounting portion about a first mounting pivot axis, and
the mounting contact surface is provided on at least one of the first mounting portion and the second mounting portion.

15. The operating device according to claim 14, wherein
the mounting part includes a third mounting portion pivotally coupled to the second mounting portion about a second mounting pivot axis, and
the mounting contact surface is provided to at least one of the first mounting portion, the second mounting portion, and the third mounting portion.

16. The operating device according to claim 1, wherein
the mounting part includes a coupling portion to which an additional device is to be coupled.

17. The operating device according to claim 16, wherein
the coupling portion includes a coupling opening to which the additional device is to be coupled.

18. The operating device according to claim 1, wherein
the first contact surface is spaced apart from the mounting contact surface by a first distance to form a gap between the first contact surface and the mounting contact surface in the axial direction.

19. An operating device for a human-powered vehicle, comprising:
a base member including
a base body, and
a mounting part configured to couple the base body to a tubular part of the human-powered vehicle; and
an operating member movably coupled to the base member,
the mounting part including a mounting contact surface contactable with the tubular part of the human-powered vehicle in a mounting state where the mounting part couples the base body to the tubular part of the human-powered vehicle, the mounting part including a mounting opening having an opening center axis defined along a longitudinal center axis of the tubular part of the human-powered vehicle in the mounting state,
the base member including
a first contact surface contactable with the tubular part of the human-powered vehicle in the mounting state, the first contact surface being spaced apart from the mounting contact surface in an axial direction with respect to the opening center axis,
a cylinder bore, and
an intermediate hole extending from the cylinder bore toward the first contact surface.

20. An operating device for a human-powered vehicle, comprising:
a base member including
a base body, and
a mounting part configured to couple the base body to a tubular part of the human-powered vehicle, at least part of the mounting part being integrally provided with the base body as a one-piece unitary member; and
an operating member movably coupled to the base member,
the mounting part including a mounting contact surface contactable with the tubular part of the human-powered vehicle in a mounting state where the mounting part couples the base body to the tubular part of the human-powered vehicle, the mounting part including a mounting opening having an opening center axis defined along a longitudinal center axis of the tubular part of the human-powered vehicle in the mounting state, the base member including
  a first contact surface contactable with the tubular part of the human-powered vehicle in the mounting state, the first contact surface being spaced apart from the mounting contact surface in an axial direction with respect to the opening center axis, and
  a second contact surface contactable with the tubular part of the human-powered vehicle in the mounting state, the second contact surface being spaced apart from the mounting contact surface and the first contact surface in the axial direction, and
the mounting contact surface being provided between the first contact surface and the second contact surface in the axial direction, wherein
the first contact surface is closer to the mounting contact surface than the second contact surface in the axial direction.

21. An operating device for a human-powered vehicle, comprising:
  a base member including
    a base body, and
    a mounting part configured to couple the base body to a tubular part of the human-powered vehicle, at least part of the mounting part being integrally provided with the base body as a one-piece unitary member; and
  an operating member movably coupled to the base member,
  the mounting part including a mounting contact surface contactable with the tubular part of the human-powered vehicle in a mounting state where the mounting part couples the base body to the tubular part of the human-powered vehicle, the mounting part including a mounting opening having an opening center axis defined along a longitudinal center axis of the tubular part of the human-powered vehicle in the mounting state,
  the base member including
    a first contact surface contactable with the tubular part of the human-powered vehicle in the mounting state, the first contact surface being spaced apart from the mounting contact surface in an axial direction with respect to the opening center axis, and
    a second contact surface contactable with the tubular part of the human-powered vehicle in the mounting state, the second contact surface being spaced apart from the mounting contact surface and the first contact surface in the axial direction, and
  the mounting contact surface being provided between the first contact surface and the second contact surface in the axial direction, wherein
  the operating member is pivotally coupled to the base body about a pivot axis, and
  the mounting contact surface is closer to the pivot axis than the first contact surface in the axial direction.

\* \* \* \* \*